US012351238B2

(12) United States Patent
Czinger et al.

(10) Patent No.: US 12,351,238 B2
(45) Date of Patent: Jul. 8, 2025

(54) MOTOR NODES

(71) Applicant: Divergent Technologies, Inc., Los Angeles, CA (US)

(72) Inventors: Kevin Robert Czinger, Santa Monica, CA (US); Antonio Bernerd Martinez, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 120 days.

(21) Appl. No.: 17/975,381

(22) Filed: Oct. 27, 2022

(65) Prior Publication Data

US 2023/0133075 A1    May 4, 2023

Related U.S. Application Data

(60) Provisional application No. 63/274,809, filed on Nov. 2, 2021.

(51) Int. Cl.
*B62D 21/09* (2006.01)
*B60K 1/00* (2006.01)
(Continued)

(52) U.S. Cl.
CPC ............... *B62D 21/09* (2013.01); *B60K 1/00* (2013.01); *B62D 21/152* (2013.01); *B62D 21/18* (2013.01)

(58) Field of Classification Search
CPC ...... B62D 21/09; B62D 29/046; B62D 21/11; B62D 21/00; B60K 1/00; B60K 7/0007;
(Continued)

(56) References Cited

U.S. PATENT DOCUMENTS 5,203,226 A    4/1993 Hongou et al.
5,742,385 A    4/1998 Champa
(Continued)

FOREIGN PATENT DOCUMENTS

WO    1996036455 A1    11/1996
WO    1996036525 A1    11/1996
(Continued)

OTHER PUBLICATIONS

US 9,202,136 B2, 12/2015, Schmidt et al. (withdrawn)
(Continued)

*Primary Examiner* — Paul N Dickson
*Assistant Examiner* — Tiffany L Webb
(74) *Attorney, Agent, or Firm* — ArentFox Schiff LLP

(57) ABSTRACT

Integrated vehicle structures are provided herein. An integrated vehicle structure can include an enclosure portion configured to house an electric motor and a plurality of extended portions extending from the enclosure portion. The enclosure portion and the plurality of extended portions can be load-bearing and configured to bear vehicle loads. The extended portions of the integrated vehicle structures can include a connection portion configured to connect with another load-bearing structure to at least receive or transmit loads. The plurality of extended portions can be configured to transfer vehicle loads along physically separate paths. A portion of the enclosure portion can define an opening configured to allow a drive shaft to connect the electric motor to a wheel. The enclosure portion can be configured with an opening for allowing the installation and removal of the electric motor.

19 Claims, 21 Drawing Sheets

(51) Int. Cl.
  *B62D 21/15* (2006.01)
  *B62D 21/18* (2006.01)
(58) Field of Classification Search
  CPC .... B60K 2001/001; B60K 6/405; B60K 6/26; B60Y 2410/10; B60Y 2400/60; B60L 2220/44; B60W 10/08; H02K 5/00
  See application file for complete search history.

(56) References Cited

U.S. PATENT DOCUMENTS

| | | |
|---|---|---|
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,321,863 B1 * | 11/2001 | Vanjani ................ B60L 50/66 180/206.5 |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,245,804 B2 * | 8/2012 | van Rooij ................ B62M 6/65 180/65.6 |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,800,702 B2 * | 8/2014 | Yamamoto ............ B60K 7/0007 301/6.5 |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |

(56) References Cited

U.S. PATENT DOCUMENTS

| | | |
|---|---|---|
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |

(56) References Cited

U.S. PATENT DOCUMENTS

| | | | |
|---|---|---|---|
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,432,058 B2 * | 10/2019 | Berkouk | H02K 5/24 |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 10,696,149 B2 * | 6/2020 | Pearce, Jr. | B60H 1/00392 |
| 10,814,711 B2 * | 10/2020 | Suumen | B62D 25/20 |
| 10,836,231 B2 * | 11/2020 | Wang | B60G 17/0157 |
| 10,894,458 B2 * | 1/2021 | Battaglia | B60G 11/08 |
| 10,971,970 B2 * | 4/2021 | Jahshan | B60L 58/21 |
| 10,981,600 B2 * | 4/2021 | Yamada | B62D 21/11 |
| 11,292,332 B2 * | 4/2022 | Mepham | F16H 57/02 |
| 11,390,128 B2 * | 7/2022 | Battaglia | B60K 1/00 |
| 11,912,118 B2 * | 2/2024 | Schantl | B60K 1/00 |
| 2004/0222030 A1 * | 11/2004 | Szalony | B60G 3/24 180/311 |
| 2004/0222031 A1 * | 11/2004 | Szalony | B62D 21/11 180/311 |
| 2006/0108783 A1 | 5/2006 | Ni et al. | |
| 2014/0277669 A1 | 9/2014 | Nardi et al. | |
| 2015/0083505 A1 * | 3/2015 | Pearce, Jr. | B60H 1/00278 310/68 D |
| 2017/0113344 A1 | 4/2017 | Schönberg | |
| 2017/0341309 A1 | 11/2017 | Piepenbrock et al. | |
| 2018/0345786 A1 * | 12/2018 | Kucharski | B60B 35/14 |
| 2019/0391563 A1 * | 12/2019 | Macey | B33Y 30/00 |
| 2020/0039288 A1 | 2/2020 | Hirata et al. | |
| 2020/0353982 A1 * | 11/2020 | Viereck | B62D 21/11 |
| 2020/0384806 A1 * | 12/2020 | Falls | B60K 17/08 |
| 2021/0086600 A1 * | 3/2021 | Brock | B60K 5/12 |
| 2021/0138885 A1 * | 5/2021 | Engerman | B60K 1/00 |
| 2021/0245599 A1 * | 8/2021 | Mepham | B60B 35/16 |
| 2022/0135135 A1 * | 5/2022 | Kawai | B62D 21/155 296/187.09 |
| 2022/0212527 A1 * | 7/2022 | Kraft | B60K 7/0007 |
| 2022/0363119 A1 * | 11/2022 | Nakagawa | B60K 1/04 |
| 2023/0081161 A1 * | 3/2023 | Mepham | B60K 7/0007 180/65.6 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Manufacturing Technology Center (MTC), Case Studies, Investigating Development Opportunities of Additive Manufacturing For Electric Motor Components, Design for Additive Manufacturing: Additive Manufactured Electric Motor, 5 pages, [Online] [Retrieved on Oct. 27, 2022] Retrieved at URL <https://www.the-mtc.org/case-studies/investigating-development-opportunities-of-additive-manufacturing-for-electric-motor-components>.
International Search Report and Written Opinion in PCT/US2022/048103, mailed on Feb. 9, 2023, 6 pages.

* cited by examiner

MOTOR NODES

CROSS-REFERENCE TO RELATED APPLICATIONS

This application claims priority to, and the benefit of, U.S. Provisional Patent Application No. 63/274,809, filed on Nov. 2, 2021 and titled "MOTOR NODES", the disclosure of which is hereby incorporated by reference in its entirety as if fully set forth herein.

BACKGROUND

Field

The present disclosure relates generally to motors for electric cars, and more specifically to integration of electric motors with load bearing vehicle structures, such as chassis structures.

Background

Cars are complex machines with many separate, dedicated systems. For example, cars have load bearing structure whose function is to bear various loads experienced by the vehicle, such as suspension loads that support the car and keep the body from resting on the ground, and crash loads that can occur if the car hits or is hit by an object, such as another car. The load bearing structure includes, for example, the chassis, suspension components, bumpers, and crash rails. These load bearing structures are connected together so that the various loads experienced by the car are distributed properly so that the car can be driven safely, e.g., without bottoming out or having components shake loose, and can protect the occupants in a crash. Put simply, the load bearing structure provides support for all other systems of the car, which are attached to the load bearing structure. One of these other, separate systems is the drive system, e.g., the drivetrain.

The drivetrain of electric cars typically includes an electric motor to power each wheel. Like the other separate, dedicated systems, the electric motors are attached to the load bearing structure by, for example, brackets, bolts, bushings, etc. More specifically, the outer housing of the motor is attached to the load bearing structure, e.g., the chassis. The outer housing (which is typically metal) serves to protect the inner operating parts of the motor, and serves no other purpose. In this way, the function of the load bearing structure and the function of the outer housing of the electric motor remain separate and distinct.

SUMMARY

In this disclosure, it is recognized that the outer housing of an electric motor could serve as part of the load bearing structure of the car, if it could be properly integrated with the load bearing structure. In this way, for example, one advantage of integrating the electric motor housing with the load bearing structure is the total weight of the car may be reduced because the metal housing can now serve the dual purpose of protecting the inner part of the motor and bearing vehicle loads. Moreover, integrating can eliminate the need for the typical brackets, bolts, bushings, etc. conventionally needed to attach the motor housing to the chassis. Another potential advantage of this integration is that assembly of the car can be simplified because the step of attaching the motor to the chassis, for example, can be eliminated.

In an aspect, an integrated vehicle structure is provided having an enclosure portion that can be configured to house an electric motor. The integrated vehicle structure further includes a plurality of extended portions extending from the enclosure portion. In one or more implementations, the enclosure portion and the plurality of extended portions are load-bearing and configured to bear vehicle loads.

In one or more implementations, at least one of the extended portions includes a connection portion that can be configured to connect with another load-bearing structure to at least receive or transmit loads. Further, the connection portion can be configured to connect with the other load-bearing structure by an adhesive connection, a bolted connection, or a welded connection. Additionally, the connection portion can include a tongue or a groove for the adhesive connection. The connection portion can also include a threaded bolt hole or a protruding bolt portion for the bolted connection. In one or more implementations, the other load-bearing structure includes a safety structure. For example, the safety structure can include a crash rail or a safety cell. In one or more implementations the other load-bearing structure includes a suspension structure. For example, the suspension structure can include a control arm or a suspension damper system.

In one or more implementations, the plurality of extended portions can be configured to transfer vehicle loads along physically separate paths. For example, the physically separate paths can include at least two physically separate paths that diverge from each other. In one or more implementations, the vehicle loads transferred along the at least two of the physically separate paths include crash loads. Additionally in one or more implementations, the plurality of extended portions can include two or more extended portions. For example, the plurality of extended portions can include at least three, four, or five extended portions.

In one or more implementations, a portion of the enclosure portion defines an opening configured to allow a drive shaft to connect the electric motor to a wheel.

In one or more implementations, the enclosure portion can be configured with an opening for allowing the installation and removal of the electric motor. Further, a part of the enclosure portion surrounding the opening can be configured to attach to a part of the electric motor. In one or more implementations, the part of the electric motor includes a stator casing. In one or more implementations, the part of the enclosure portion surrounding the opening includes a vibration damper interface configured to accept a vibration damper.

Other aspects will become readily apparent to those skilled in the art from the following detailed description, wherein is shown and described only several embodiments by way of illustration. As will be realized by those skilled in the art, concepts herein are capable of other and different embodiments, and several details are capable of modification in various other respects, all without departing from the present disclosure. Accordingly, the drawings and detailed description are to be regarded as illustrative in nature and not as restrictive.

BRIEF DESCRIPTION OF THE DRAWINGS

Various aspects of integrating electric motors with load bearing structure will now be presented in the detailed description by way of example, and not by way of limitation, in the accompanying drawings, wherein.

DETAILED DESCRIPTION

Figure 1:
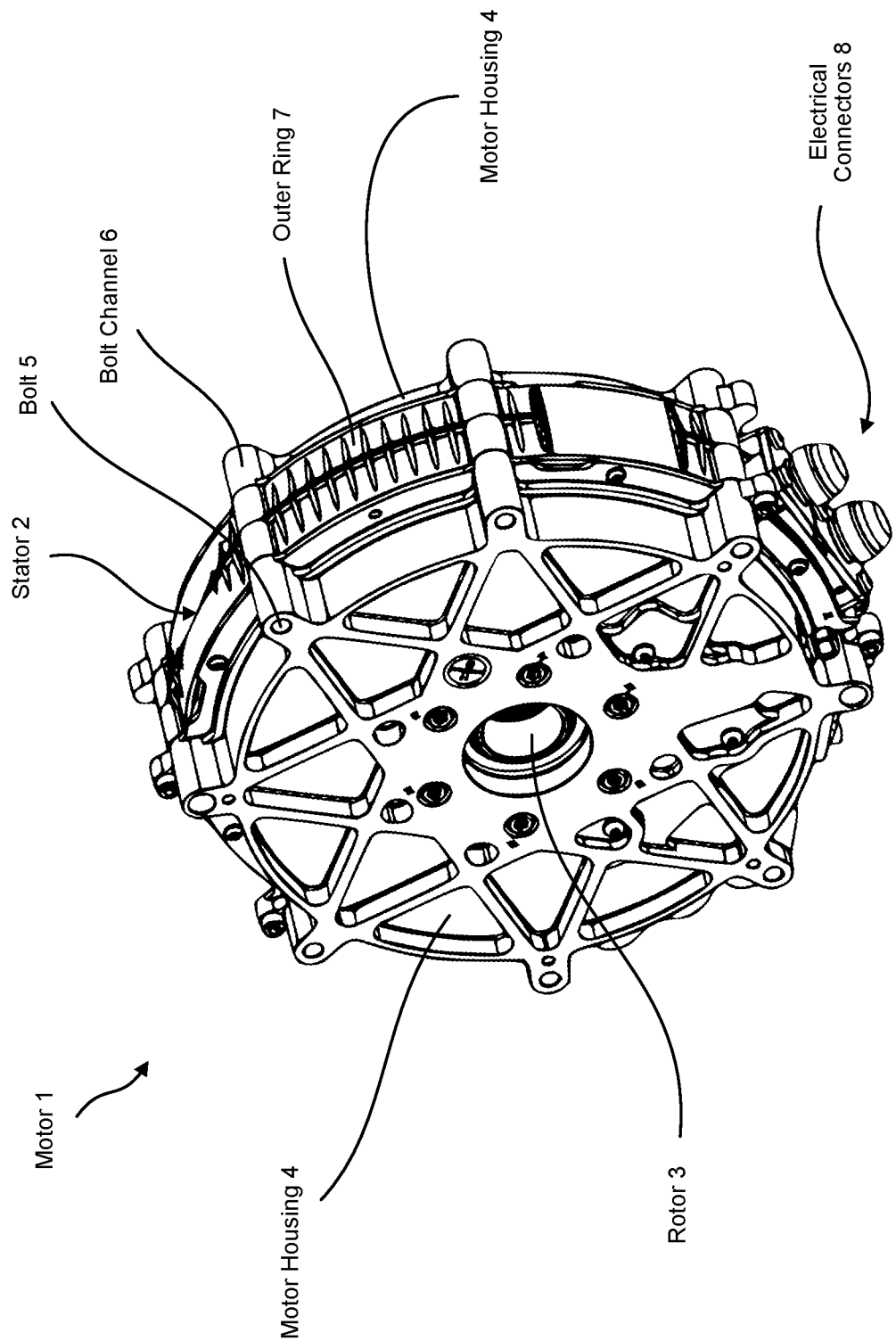
FIG. 1 illustrates an example electric motor.

FIG. 1 illustrates an example motor 1, which is an electric motor. Motor 1 can include a stator 2, a rotor 3, and a motor housing 4. Motor 1 can be, for example, a pancake motor with generally flat sides. Motor housing 4 can include two portions, with one covering each of the sides of motor 1. The two portions of motor housing 4 can be attached to the sides of motor 1 by bolts 5, which can be arranged in bolt channels 6. The function of motor housing 4 is to cover and protect stator 2, rotor 3, and other internal components of motor 1 (such as, e.g., wiring, electronic controllers, etc.). In this example, a stator casing, e.g., an outer ring 7 of stator 2, can be exposed to the outside and can serve the function of covering and protecting the sides of the stator. In this regard, outer ring 7 may be considered a housing as well and includes a portion of bolt channels 6 such that when the two portions of motor housing 4 are bolted together, the outer ring contributes to the covering and protection of the internal components of motor 1. Motor 1 can also include electrical connectors 8, which can be connected to an electrical source to provide electrical power to the motor.

Figure 2:
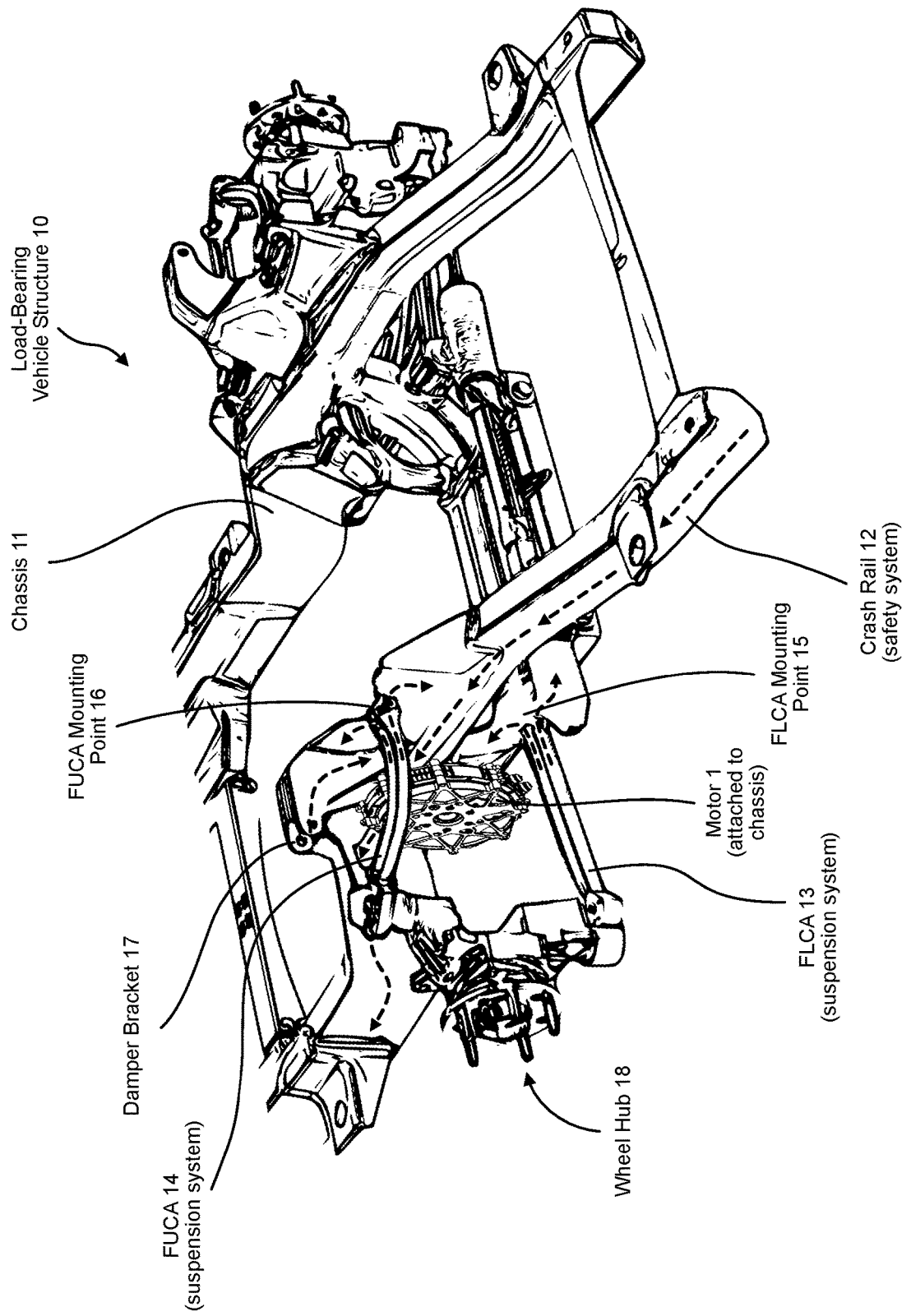
FIG. 2 illustrates an example mounting of the motor onto a load-bearing vehicle structure.

FIG. 2 illustrates an example mounting of motor 1 onto a load-bearing vehicle structure 10. Load-bearing vehicle structure 10 can include a chassis 11. Motor 1 may be mounted directly onto chassis 11. For example, motor 1 may be mounted onto chassis by, e.g., being bolted directly to chassis 11, being mounted on a bracket that is attached to the chassis, being attached to a bushing that is attached to the chassis, etc. In particular, motor housing 4 may be bolted directly, or through a bracket or bushing, etc., to chassis 11.

Chassis 11 may include crash rails 12, and a safety cell (not shown), which may be attached to the chassis, to protect the vehicle's occupants during a crash. Crash rails 12 and the safety cell are safety structures of the vehicle's safety system. The function of the safety structures is to absorb and redirect crash loads from a crash impact. FIG. 2 illustrates examples of crash loads as dashed arrowed lines traveling along a single path through crash rail 12 and into chassis 10. Notably, the crash loads do not travel through motor 1. In particular, the crash loads do not travel through motor housing 4 or outer ring 7. The crash loads bypass motor housing 4 and outer ring 7 as they travel through chassis 11. As explained above, the function of motor housing 4 and outer ring 7 is to cover and protect the internal components of motor 1. Motor housing 4 and outer ring 7 do not function to absorb or redirect crash loads.

Chassis 11 can include mounting points for a suspension system, which can include suspension system structures such as a front, lower control arm (FUCA) 13, a front, upper control arm (FUCA) 14, and a damper (not shown). In particular, chassis 11 can include a FLCA mounting point 15 to mount FLCA 13, a FUCA mounting point 16 to mount FUCA 14, and a damper bracket 17 to mount the damper. The suspension system is connected to a wheel hub 18 that attaches to a wheel (not shown). The suspension system supports the vehicle's weight and keep the vehicles wheels in proper position and operation by carrying suspension loads from the wheels through chassis 11. The suspension loads are illustrated as dashed, arrowed lines that travel from the suspension structures into chassis 11 through the mounting points in the chassis. Similar to the crash loads, the suspension loads do not travel through motor 1, and in particular, do not travel through motor housing 4 or outer ring 7. As explained above, the function of motor housing 4 and outer ring 7 is to cover and protect the internal components of motor 1. Motor housing 4 and outer ring 7 do not function to support the weight of the vehicle or keep the wheels in proper position and operation by carrying suspension loads.

In the example of FIG. 2 above, motor housing 4 serves only a single function, i.e., covering and protecting the internal components of motor 1. Disclosed below are various embodiments in which a multi-function structure can serve both as a housing of a motor and as a load-bearing structure of a vehicle. In this way, for example, a multi-function structure may reduce the weight of a vehicle and/or reduce the complexity of assembly of the vehicle.

Figure 3:
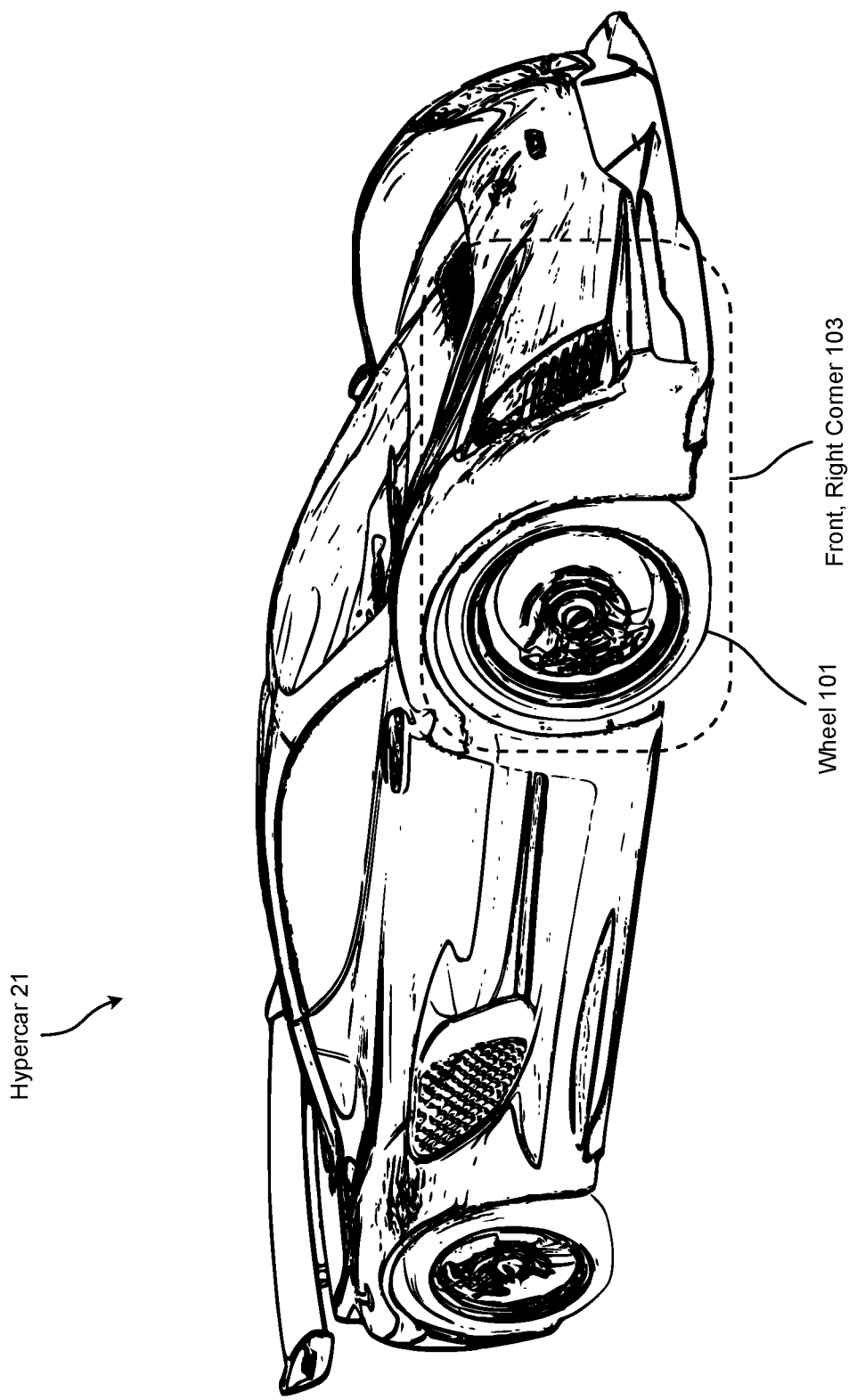
FIG. 3 illustrates a perspective view of a hypercar 21 in which various embodiments of this disclosure may be implemented.

FIG. 3 illustrates a perspective view of a hypercar 21 in which various embodiments of this disclosure may be implemented. Hypercar 21 may be an electric or hybrid car that includes one or more electric motors to power wheels, such as a wheel 101 located in a front, right corner 103 of the hypercar. The viewing angle of hypercar 21 in FIG. 3 was chosen to establish a frame of reference in the reader's mind for subsequent figures, which illustrate interior structure of the hypercar, particularly interior structure located in front, right corner 103. In various embodiments, hypercar 21 may include a multi-functional structure that covers and protects the internal components of a motor and that serves as a load-bearing structure of the vehicle.

Figure 4:
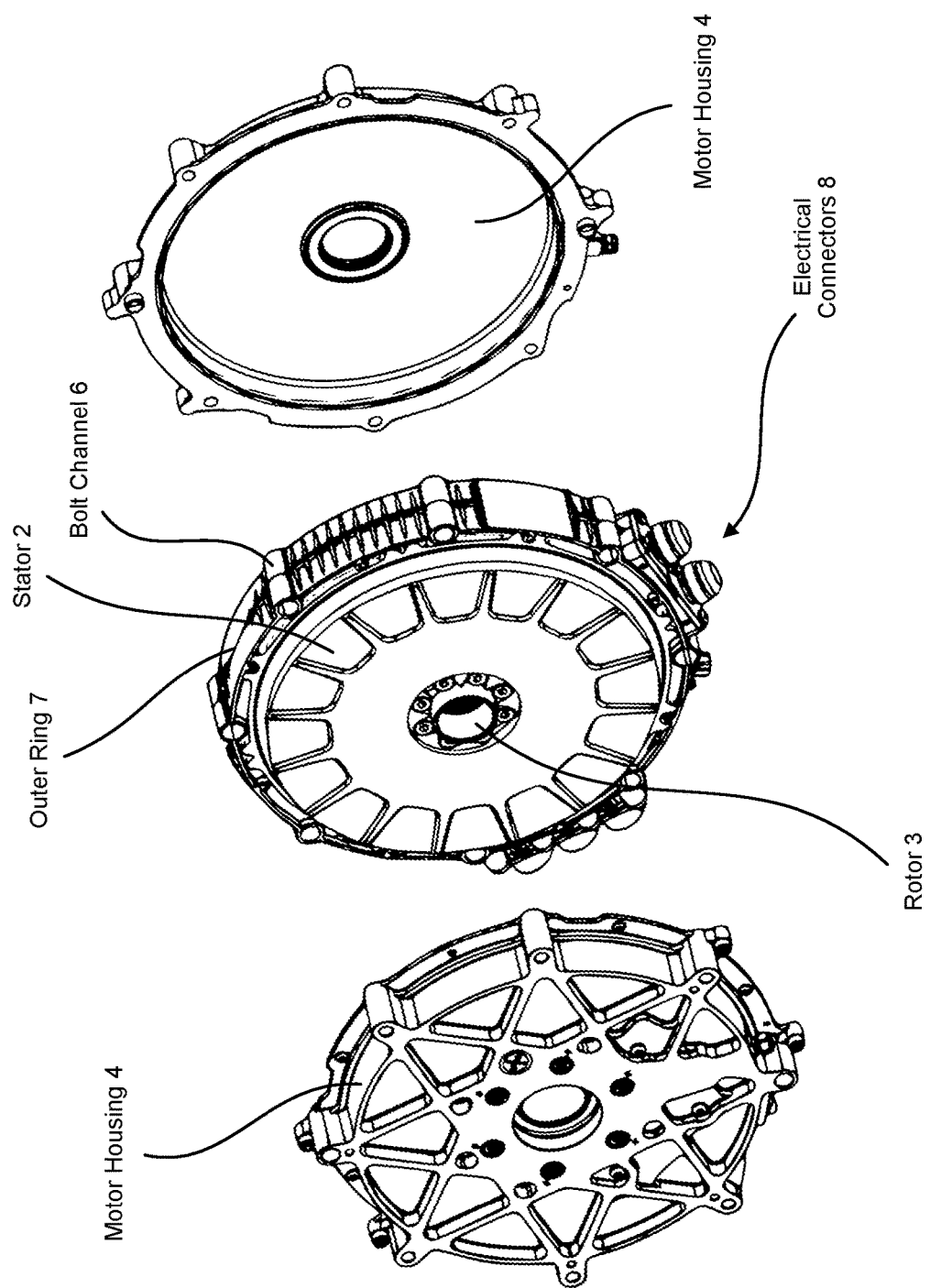
FIG. 4 illustrates an exploded view of the motor, with its motor housings removed.

In this regard, FIG. 4 illustrates an exploded view of motor 1, with motor housings 4 removed. In this example, bolts 5 may be removed to allow motor housings 4 to be removed from motor 1. FIG. 4 shows more clearly stator 2 and rotor 3, which were obscured or partially obscured by motor housings 4 in the previous figures. In the following example embodiments, motor housings 4 may be replaced with multi-functional structure as described in more detail below.

In various embodiments, a multi-functional structure may be comprised of a node. A node is a structure, typically a 3D printed structure, that is used to combine two or more parts together, such as tubes, extrusions, panels, or other nodes. 3D printed nodes, in particular, may be complex structures that can be designed and optimized to handle various load cases efficiently, using less mass/material than structures manufactured using conventional methods. Design optimization of load-bearing nodes often results in nodes that appear organic in shape, much like the shape of animal bones. This is because 3D printing can allow material to be placed only where it is needed to handle loads, much like nature has evolved animals' bones to have the required strength only in the right locations using the minimum amount of bone. In this regard, for the sake of visualizing the design and optimization a multi-functional 3D printed node that can bear vehicle loads and serve as a motor housing, it may be helpful to think of "growing" the 3D printed structure around the internal components of the motor.

Figure 5:
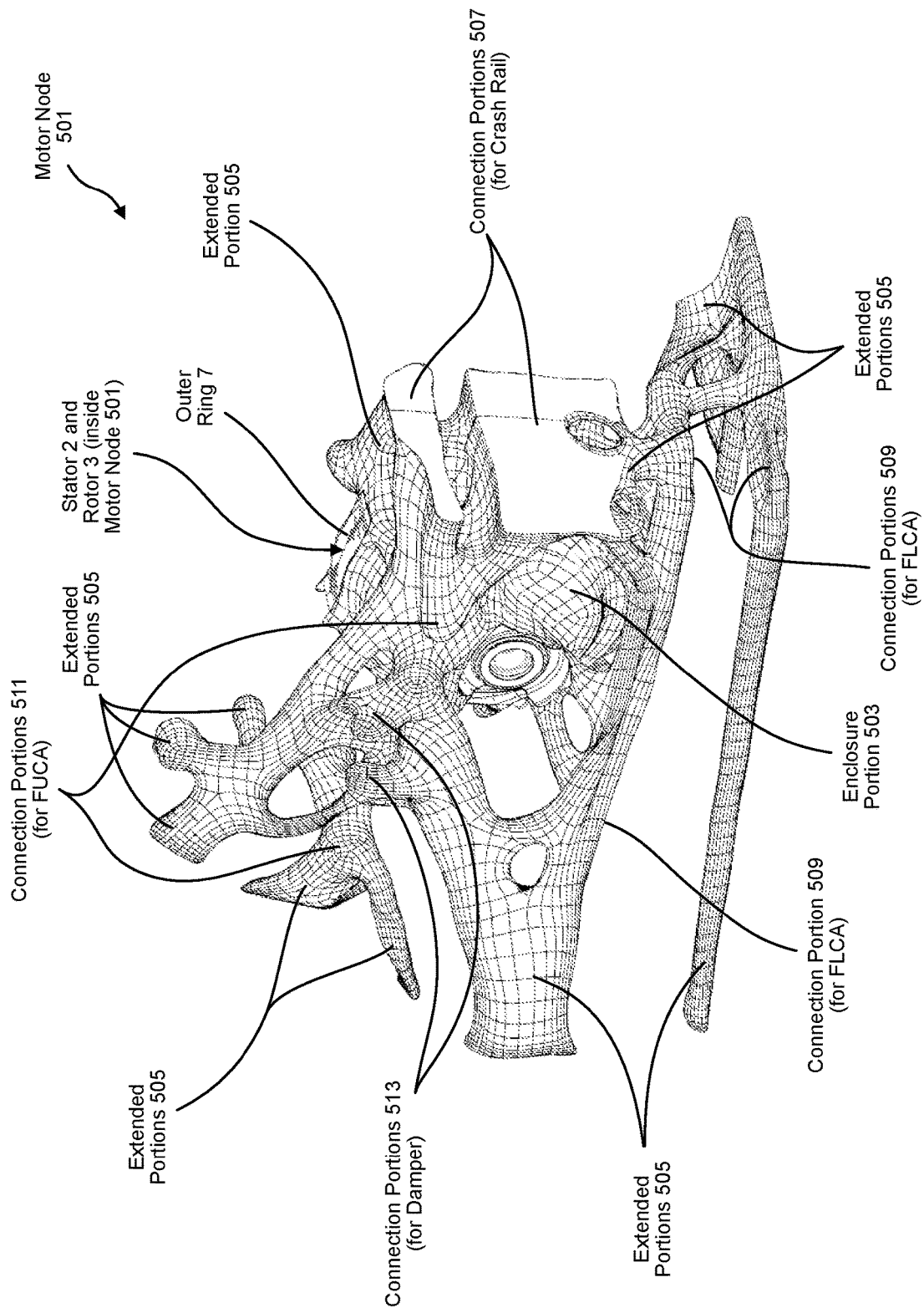
FIG. 5 illustrates an example of a multi-functional node "grown" around a stator and a rotor, i.e., the internal components of the motor.

FIG. 5 illustrates an example of a multi-functional node "grown" around stator 2 and rotor 3, i.e., the internal components of motor 1 (the node in FIG. 5 is shown from the same perspective as hypercar 21 in FIG. 3 and is designed to be located in front, right corner 103 of the hypercar). The multi-functional node is called a motor node 501 because in addition to bearing vehicle loads, it houses and protects the components of motor 1. To this effect, motor node can include an enclosure portion 503 that houses the components of motor 1. Motor node 501 can also include multiple extended portions 505 that extend from enclosure portion 503. Extended portions 505 can be designed to connect to other load-bearing vehicle structures, such as crash structures and suspension structures. For example, motor node 501 can include connection portions 507 for connecting to a crash rail of the vehicle. Motor node 501 can include connection portions 509, 511, and 513 for connecting to an FLCA, a FUCA, and a damper, respectively. These load-bearing vehicle structures connected to motor node 501 can transfer loads, such as crash loads and suspension loads, into the motor node through the connection portions. The loads can travel through motor node 501, including through extended portions 505 and enclosure portion 503, and the motor node can likewise transfer loads to other load-bearing vehicles structures through the connection portions, as described in more detail below. As shown in the figure, motor node 501 can include multiple extended portions 505. In various embodiments, motor nodes may include at least 2, 3, 4, 5, 7, 10 or more extended portions. In various embodiments, motor nodes can include multiple enclosure portions as well, for example, to house more than one motor.

In the present example embodiment, motor housings 4 are not included, but outer ring 7 is retained in the design. However, in various embodiments, the entire conventional housing around internal motor components may be replaced by a motor node structure. Similarly, in various embodiments, internal motor components can themselves be designed to be housed in a motor node without consideration of conventional motor housing. In other words, the present disclosure is not limited merely to replacing conventional motor housings with motor nodes, but includes designs of motor components and motor nodes without the constraints of conventional motor housing designs. For the sake of simplicity in the descriptions of various motor node embodiments herein, the internal components of motor 1 that are housed by a motor node are referred to as "motor 1" or "the motor" even though it is understood the entire motor 1 described above is not housed by a motor node (i.e., at least motor housings 4 are not included).

Figure 6:
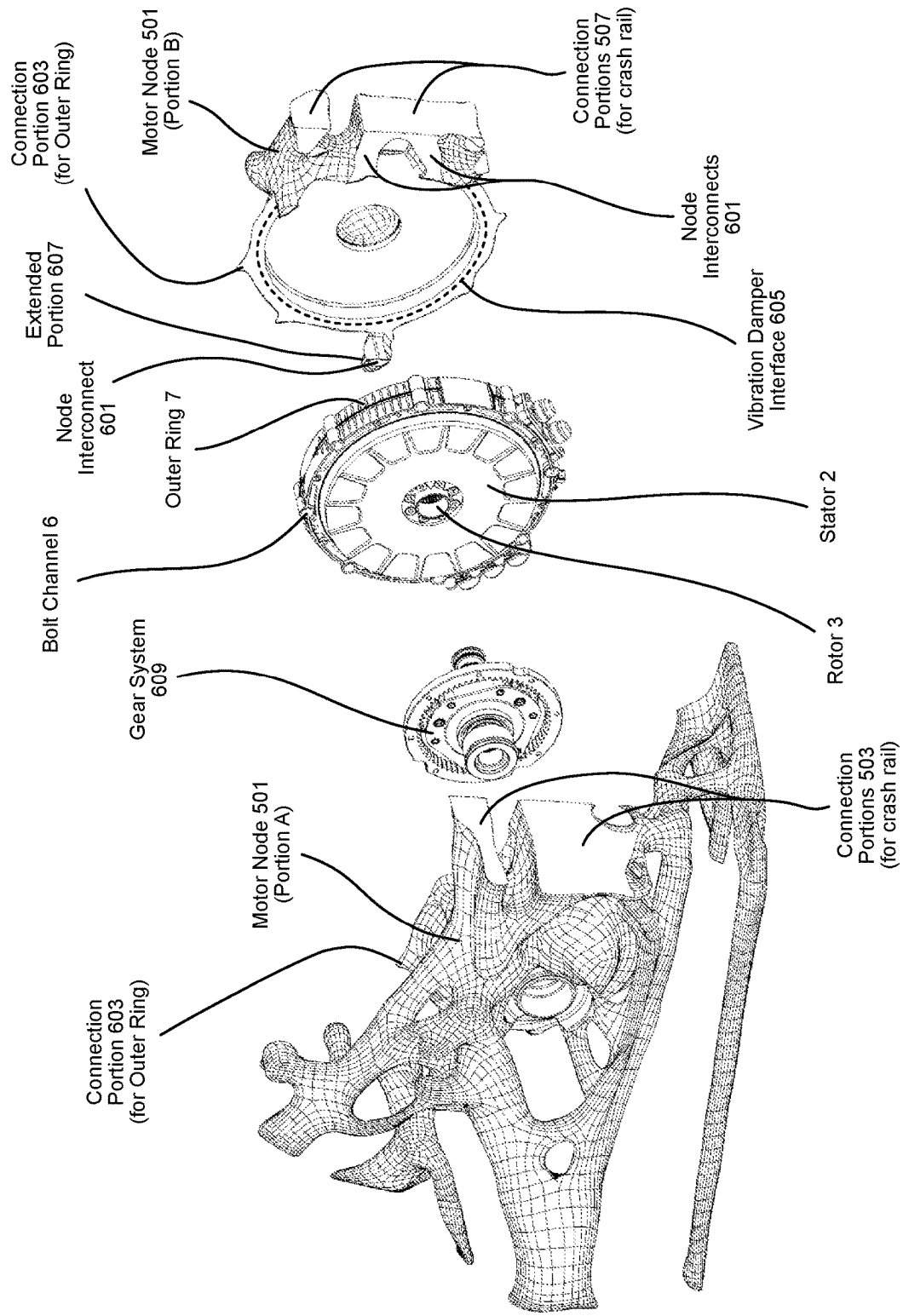
FIG. 6 illustrates an exploded view of a motor node, which more clearly shows the motor internal components, the stator and the rotor.

FIG. 6 illustrates an exploded view of motor node 501, which more clearly shows the motor internal components, stator 2 and rotor 3, and their arrangement between a portion A of the motor node and a portion B of the motor node. In this example, portions A and B can be 3D printed separately and then connected together at node interconnects 601. In various embodiments, node interconnects 601 may include, for example, tongue and groove configurations, bolt configurations, weld configurations, etc., that allow portions of motor node 501 to be attached together. In various embodiments, node interconnects between portions of motor node 501 may be configured as permanent connections. For example, a node interconnect with a tongue and groove configuration may be bonded together with an adhesive for a permanent connection. In various embodiments, node interconnects may be configured as disconnectable connections, i.e., connections that can be disconnected. For example, a node interconnect with a bolt configuration may include holes or channels for bolts to pass through each motor node portion to allow nuts to be fitted on the bolts and tightened to connect the portions.

In the present example embodiment, in which outer ring 7 of motor 1 is retained, motor node 501 can include connection portions 603 that can connect the motor node to the outer ring. Each connection portion 603 may align with a corresponding bolt channel 6 of the outer ring, and each connection portion 603 may include a threaded bolt hole for a bolt (not shown) or a protruding bolt portion for the bolted connection. For the sake of clarity in FIG. 6, only one of the connection portions 603 of portion A of the motor node is labeled, and a corresponding connection portion of portion B of the motor node is labeled. Each of the labeled connection portions 603 correspond to the labeled bolt channel 6. To connect motor node 501 to outer ring 7, a bolt may pass through connection portions 603 and bolt channel 6, and a nut may be tightened on the bolt. The process may be repeated for the unlabeled connection portions and corresponding bolt channels.

Motor node 501 may include a vibration damper interface 605, which can accept a vibration damper (not shown) that can reduce noise, vibration, and harshness (NVH) of the motor during operation. In various embodiments, vibration damper interface 605 may include a groove for a seal damper (e.g., a rubber seal), seats for springs or bushings, etc. Vibration damper interface 605 (and corresponding vibration dampers) may be tuned to the particular vibrations (e.g., resonance frequencies) produced by the motor during operation. Vibration damper interface 605 may be configured to interface with various types of dampers, for example, elastomeric dampers, composite fiber dampers, reinforced polymer dampers, etc. In various embodiments, outer ring 7 may be configured as part of motor node 501, i.e., configured to bear some loads. In this case, various embodiments could include composite fiber dampers that transfer some structural load to mitigate discontinuity. In various embodiments, 3D printed features could be included on motor node 501 to pierce through the damper and abut the outer ring, which may help transfer loads between the outer ring, which is part of the motor node, and the remaining part of the motor node.

FIG. 6 also shows an extended portion 607, which was obscured in FIG. 5. Extended portion 607 can include another node interconnect 601, which may connect to a corresponding node interconnect on portion A of the motor node (which is shown more clearly in FIG. 13 described below). Although extended portion 607 is smaller relative to other extended portions, it is notable that extended portion 607 is also load-bearing and can transfer loads from enclosure portion 503 and from portion A of the motor node (through the node interconnect) to a safety cell through a corresponding connection portion (to be described in more detail below).

FIG. 6 also shows a gear system 609, which may help transfer the rotational power of the motor to a wheel of the vehicle through a drive shaft, as described in more detail below with reference to FIG. 16.

Figure 7:
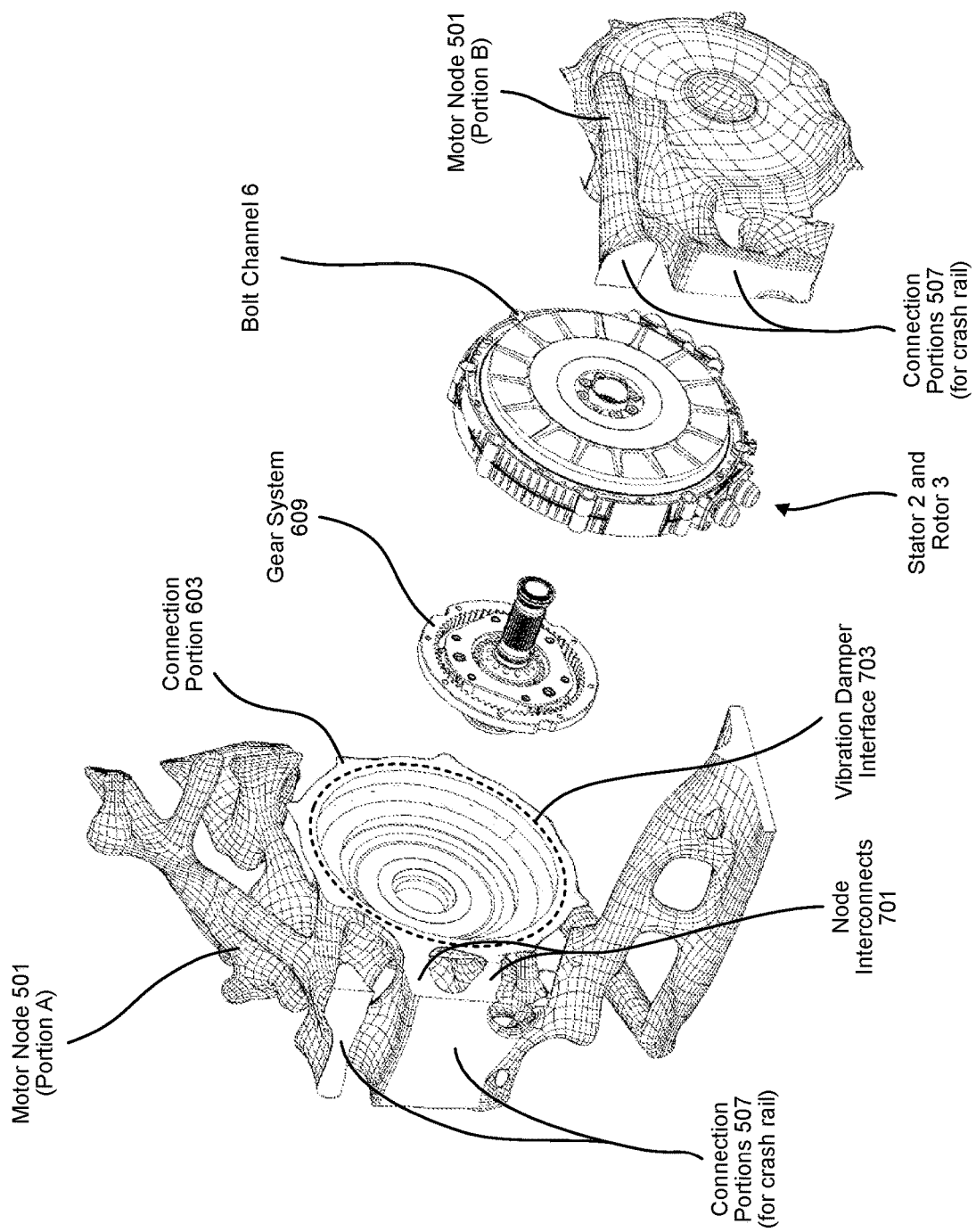
FIG. 7 illustrates the exploded view of the motor node from a different perspective.

FIG. 7 illustrates the exploded view of motor node 501 from a different perspective. Additional node interconnects 701 are visible on portion A of motor the motor node, as well as an additional vibration damper interface 703. Node interconnects 701 can connect to node interconnects 601 to join portions A and B of motor node 501 together. Vibration damper interface 703 can be similar to vibration damper interface 605 of portion B of the motor node.

In various embodiments, motor node 501 may be formed as a single piece of contiguous 3D printed material. In these embodiments, motor node 501 may not include any node interconnects, for example. In various embodiments, motor node 501 may include node interconnects at different locations than specifically described in embodiments in this disclosure.

Figure 8:
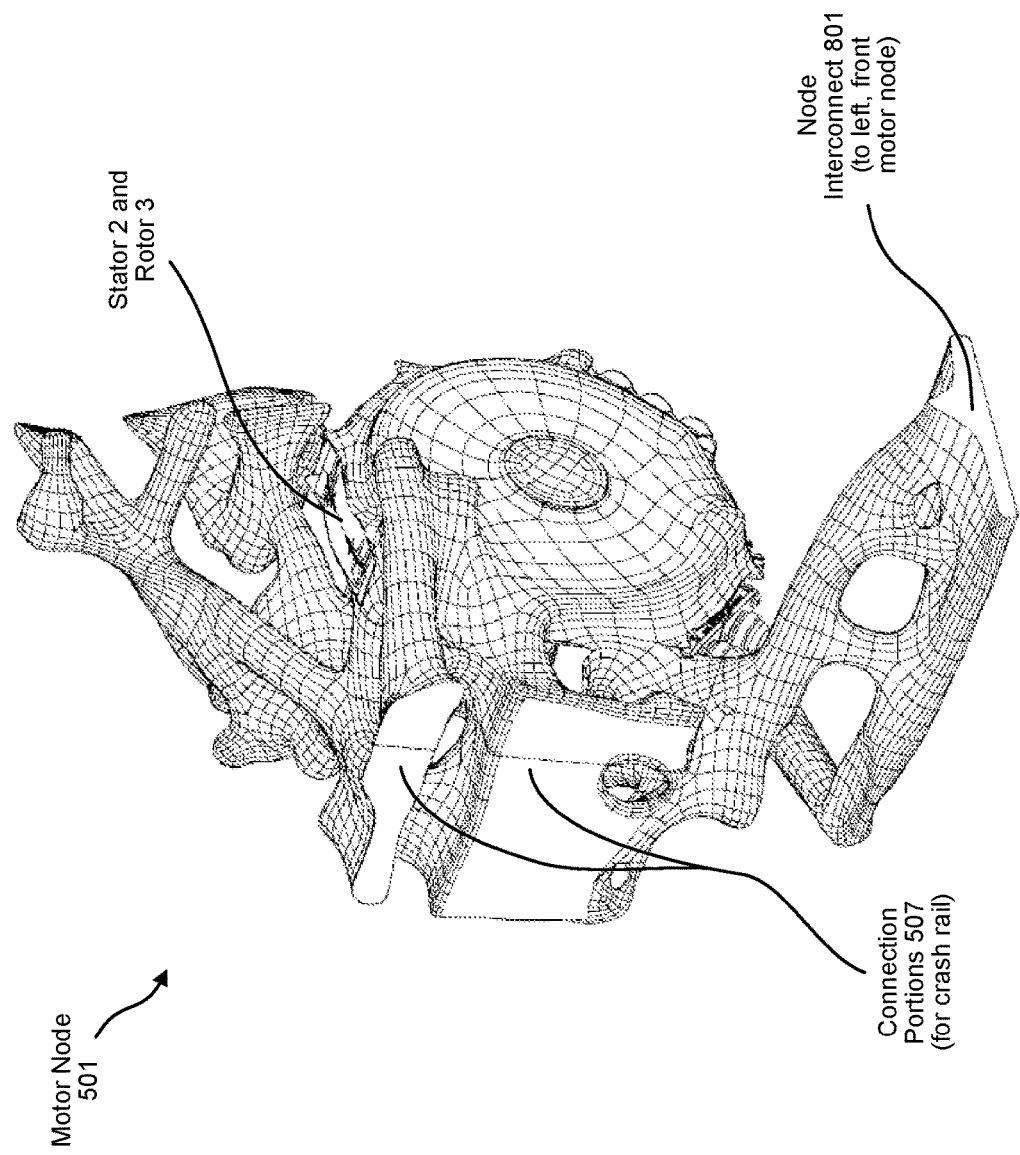
FIG. 8 illustrates the motor node with portions A and B joined together.

FIG. 8 illustrates motor node 501 with portions A and B join together. FIG. 8 highlights another node interconnect 801. As described above, motor node 501 is designed to be located in front, right corner 103 of hypercar 21. Node interconnect 801 can be configured to join with a corresponding node interconnect of a motor node in the front, left corner of hypercar 21. In other words, motor node 501 can be mirrored on the left side of the hypercar, and the two motor nodes can be joined at node interconnect 801.

Figure 9:
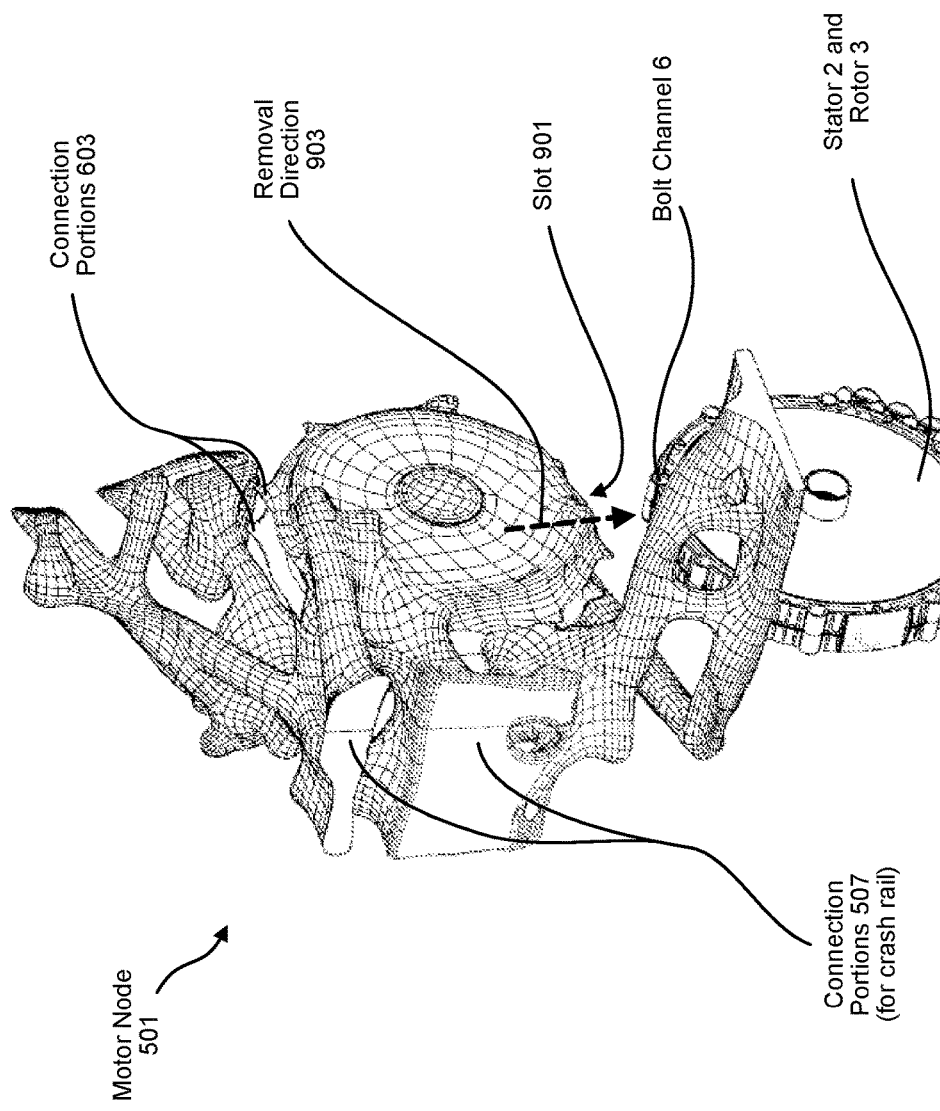
FIG. 9 illustrates a removal of the stator/rotor from the motor node.

FIG. 9 illustrates a removal of stator 2/rotor 3 from motor node 501. Motor node 501 can include an opening for allowing the installation and removal of the motor, e.g., a slot 901 at the bottom. Stator 2/rotor 3 can be removed from the motor node by removing the bolts from bolt channels 6 and sliding the stator/rotor out of slot 901 in removal direction 903. In this way, for example, the stator/rotor may be repaired or replaced as the parts wear out or break.

Figure 10:
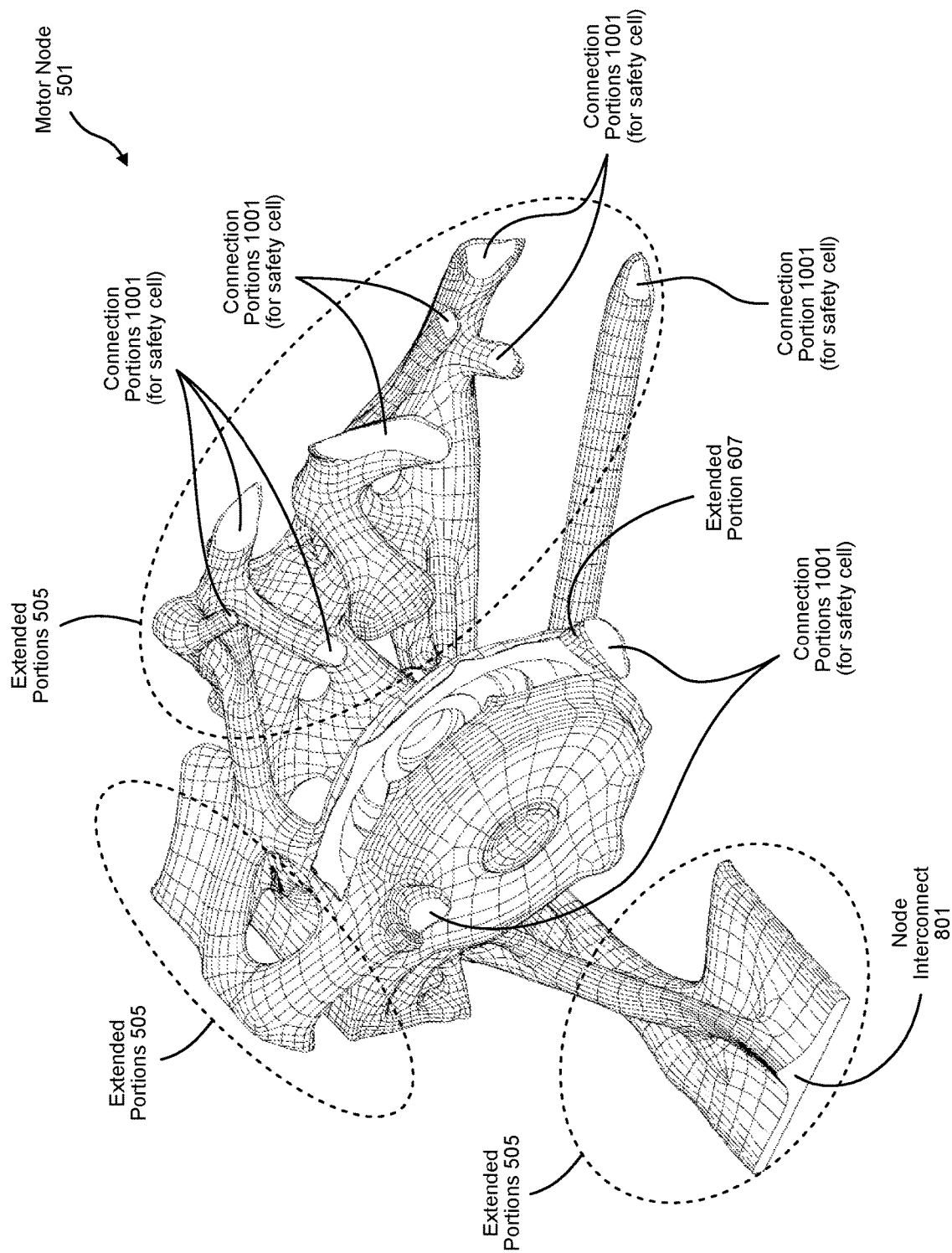
FIG. 10 illustrates another perspective of the motor node, with the stator/rotor removed.

FIG. 10 illustrates another perspective of motor node 501, with stator 2/rotor 3 removed. FIG. 10 shows the multiple extended portions 505 and extended portion 607 described above with respect to FIGS. 5 and 6, respectively. One of the extended portions 505 includes node interconnect 801, which is configured to connect to a corresponding node interconnect of the front, left motor node of hypercar 21, as described above. Extended portion 607 and many of the extended portions 505 include connection portions 1001, which are configured to connect to a safety cell of hypercar 21, described in more detailed below.

Figure 11:
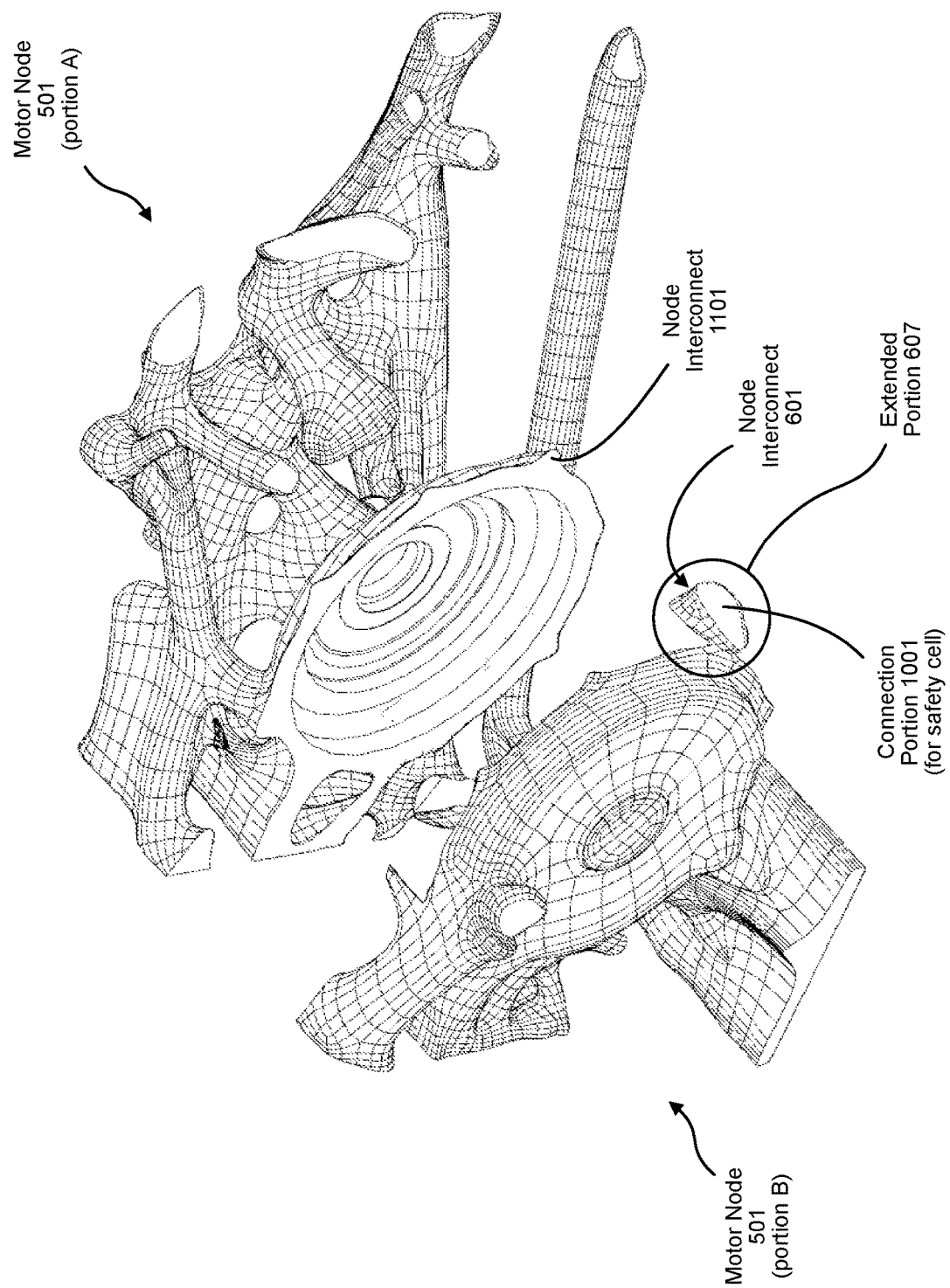
FIG. 11 illustrates the motor node from the same perspective as FIG. 10, but with portions A and B separated.

FIG. 11 illustrates motor node 501 from the same perspective as FIG. 10, but with portions A and B separated. This view shows a node interconnect 1101, which corresponds to node interconnect 601 of extended portion 607. When portions A and B of motor node 501 are joined together, node interconnect 601 of extended portion 607 and node interconnect 1101 connect with each other to form a connection that can transfer vehicle loads.

Figure 12:
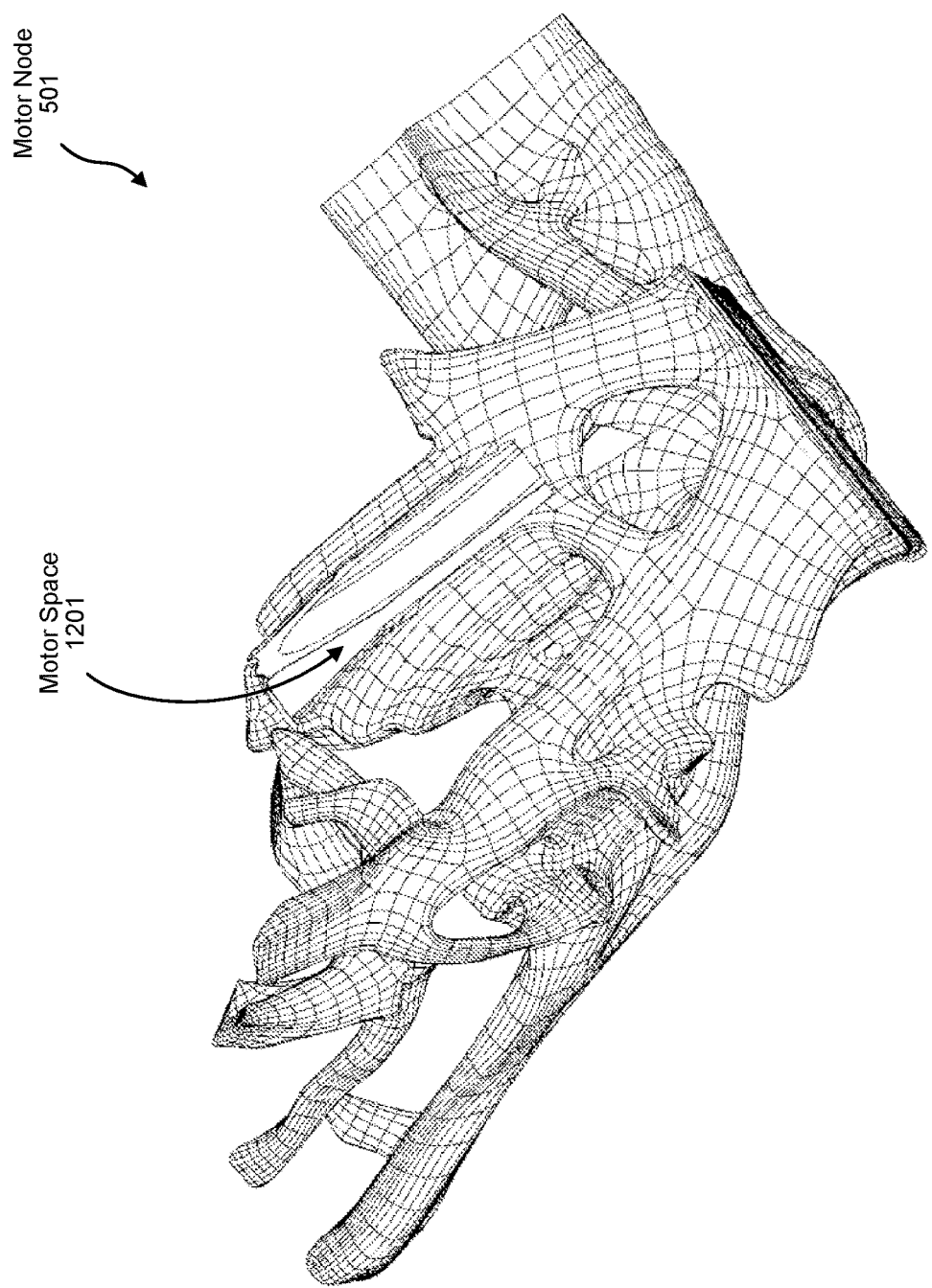
FIG. 12 illustrates a different perspective view of the motor node, roughly from above.

FIG. 12 illustrates a different perspective view of motor node 501, roughly from above. In particular, with the components of the motor, e.g., stator 2/rotor 3, removed the view shows a motor space 1201. In various embodiments in which a motor node completely or more completely encloses the motor components, the motor space may be completely or more completely enclosed.

Figure 13:
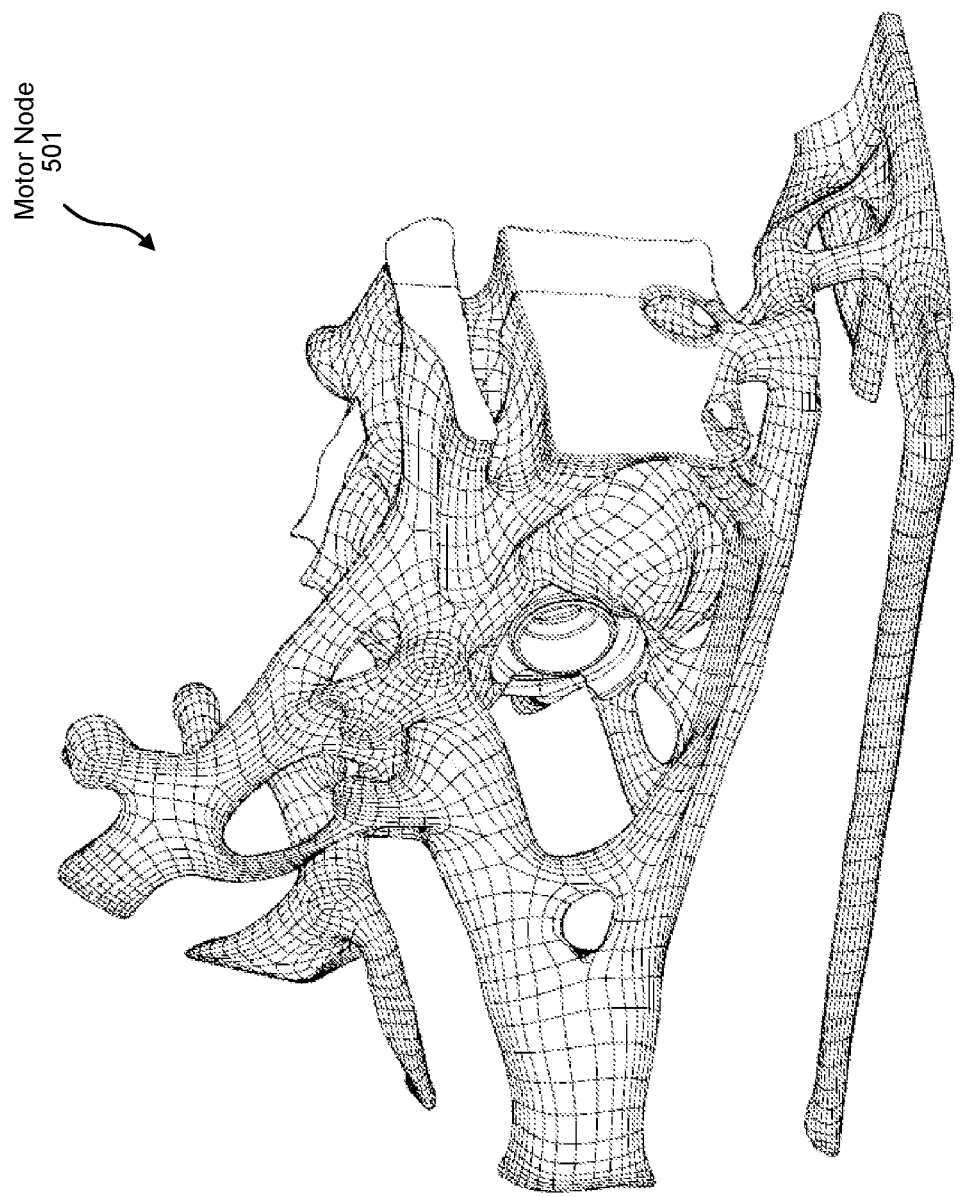
FIG. 13 illustrates the motor node without the motor components, from the perspective shown in FIG. 3 and hypercar 21.

FIG. 13 illustrates motor node 501 without the motor components, from the perspective shown in FIG. 3 and hypercar 21.

Figure 14:
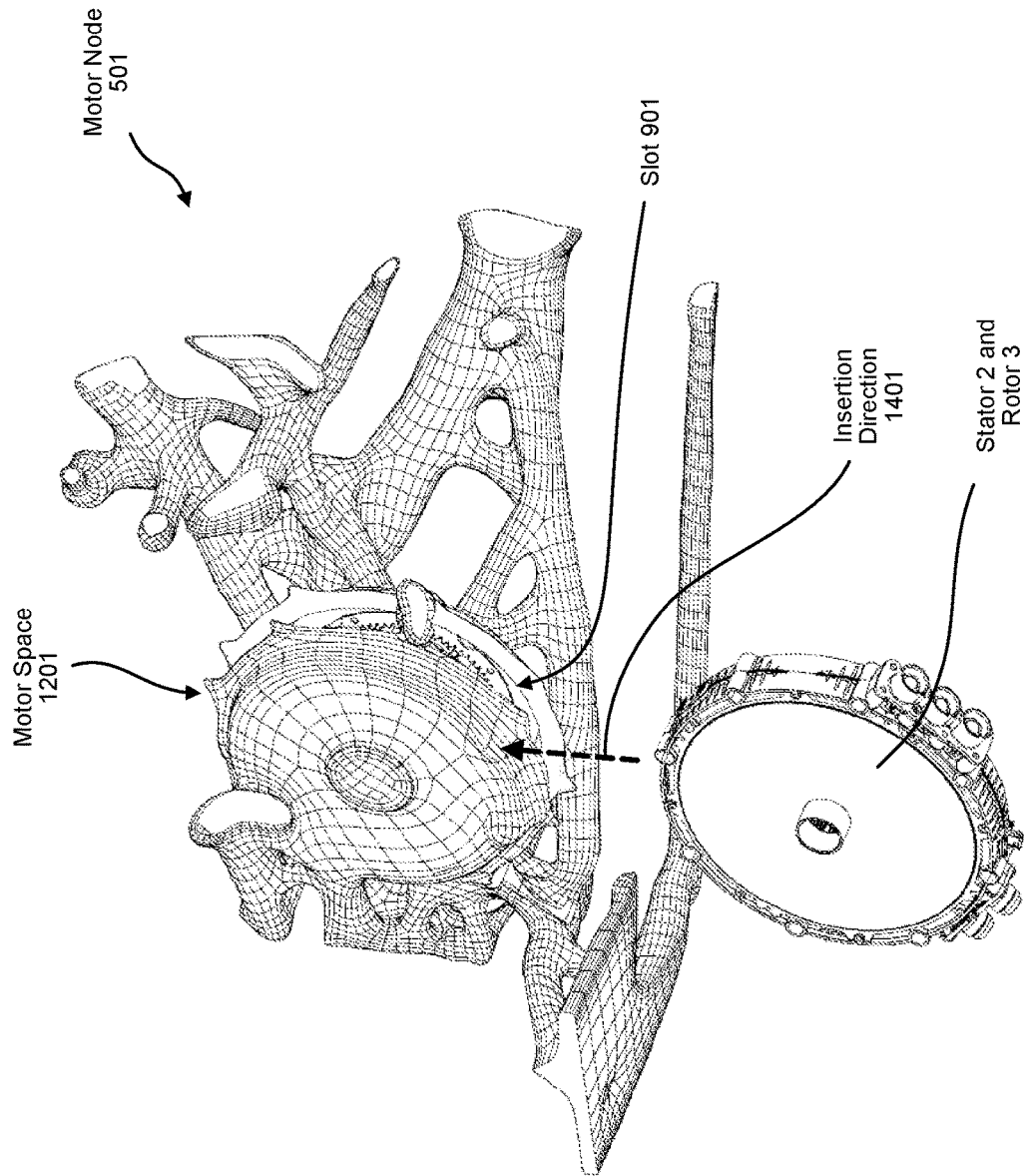
FIG. 14 illustrates an insertion of the stator/rotor into the motor node.

FIG. 14 illustrates an insertion of stator 2/rotor 3 into motor node 501. The stator/rotor may be inserted into slot 901 along an insertion direction 1401. In this way the stator/rotor may be inserted into motor space 1201. Once inserted, outer ring 7 may be bolted to the connection portions in a reverse operation as disclosed above with respect to FIG. 9. In the view of FIG. 14, it can more easily be seen that a part of enclosure portion 503 surrounding the opening, slot 901, can be configured to attach to a part of the motor, i.e., the stator casing, outer ring 7. This part of the enclosure portion surrounding the opening can include vibration damper interface 703, which is configured to accept a vibration damper as described above.

Figure 15:
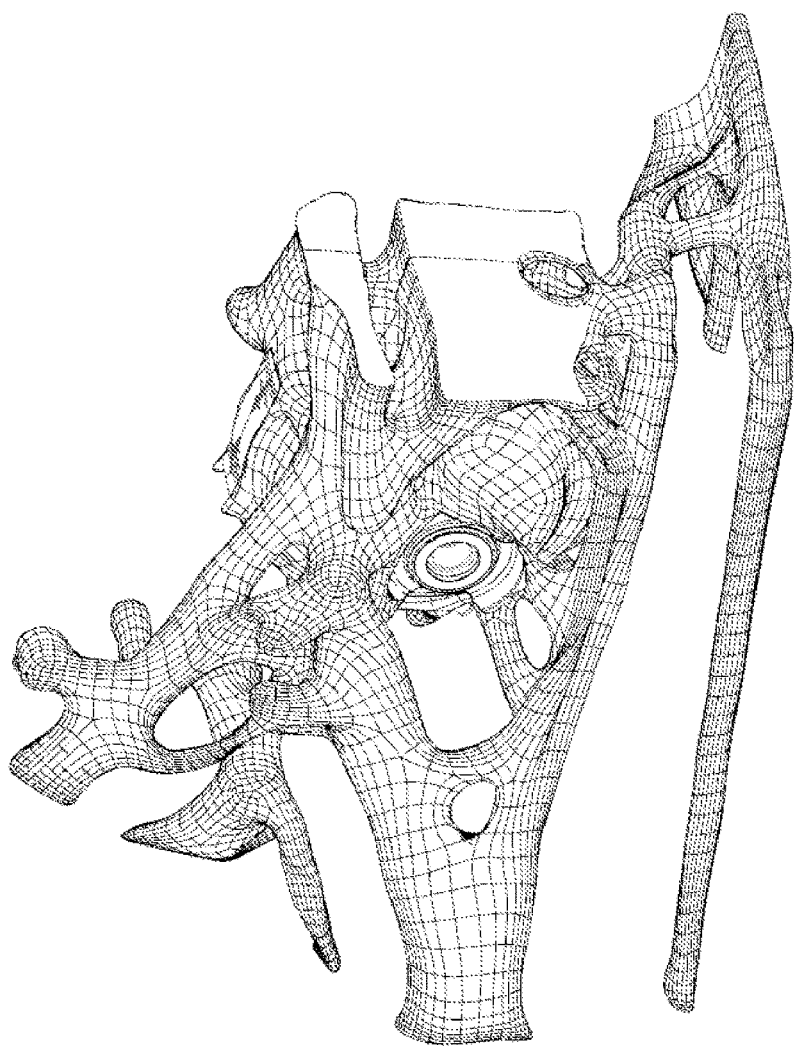
FIG. 15 illustrates the motor node, with the stator/rotor re-inserted, from the perspective shown in FIG. 3 and hypercar 21.

FIG. 15 illustrates motor node 501, with the stator/rotor re-inserted, from the perspective shown in FIG. 3 and hypercar 21.

Figure 16:
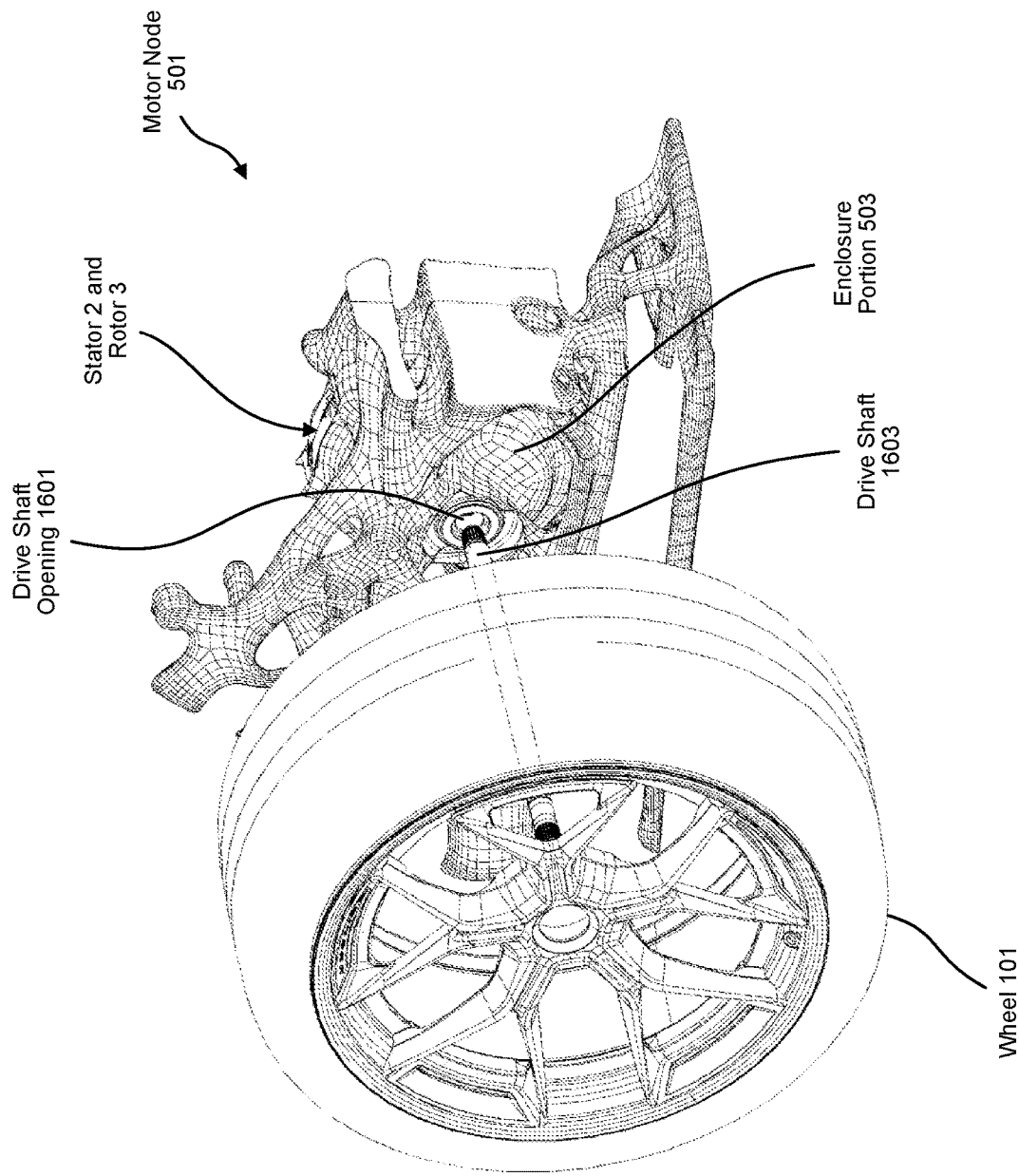
FIG. 16 illustrates an example configuration for driving the wheel according to various embodiments.

FIG. 16 illustrates an example configuration for driving wheel 101 according to various embodiments. Enclosure portion 503 of motor node 501 can include a drive shaft opening 1601, which can allow a drive shaft 1603 to connect the motor to wheel 101. In various embodiments, drive shaft 1603 may be connected to a gear system of the motor, such as gear system 609. In various embodiments, drive shaft 1603 may be connected directly to a rotor of the motor, such as rotor 3. Because loads cannot pass through open spaces, such as drive shaft opening 1601, the design of a motor node can take into account how open spaces in the motor node affect load bearing capabilities. In this regard, the space between portions A and B of motor node 501 that is occupied by outer ring 7 may be considered an open space because the outer ring is not designed to bear loads, and the motor node is designed such that loads do not pass through this space. Furthermore, the space occupied by stator 2, rotor 3, gear system 609, and any other internal motor components not shown may be considered an open space, which can be taken into account in the design of the motor node. In fact, open space occupied by motor components can be taken into account in various embodiments in which the structure of a motor node completely encloses the motor components. It is notable that design of conventional motor housings does not take load-bearing considerations into account, much less load-bearing considerations including open spaces in the housing. In other words, the structural design of a motor node may be quite different than conventional motor housing designs, at least because of the differences in the design constraints required for load bearing structure, including open spaces.

While the motor enclosed by motor node 501 is connected to drive shaft 1603 (and thus connected to wheel 101), the motor node itself can be connected to other structures of hypercar 21.

Figure 17:
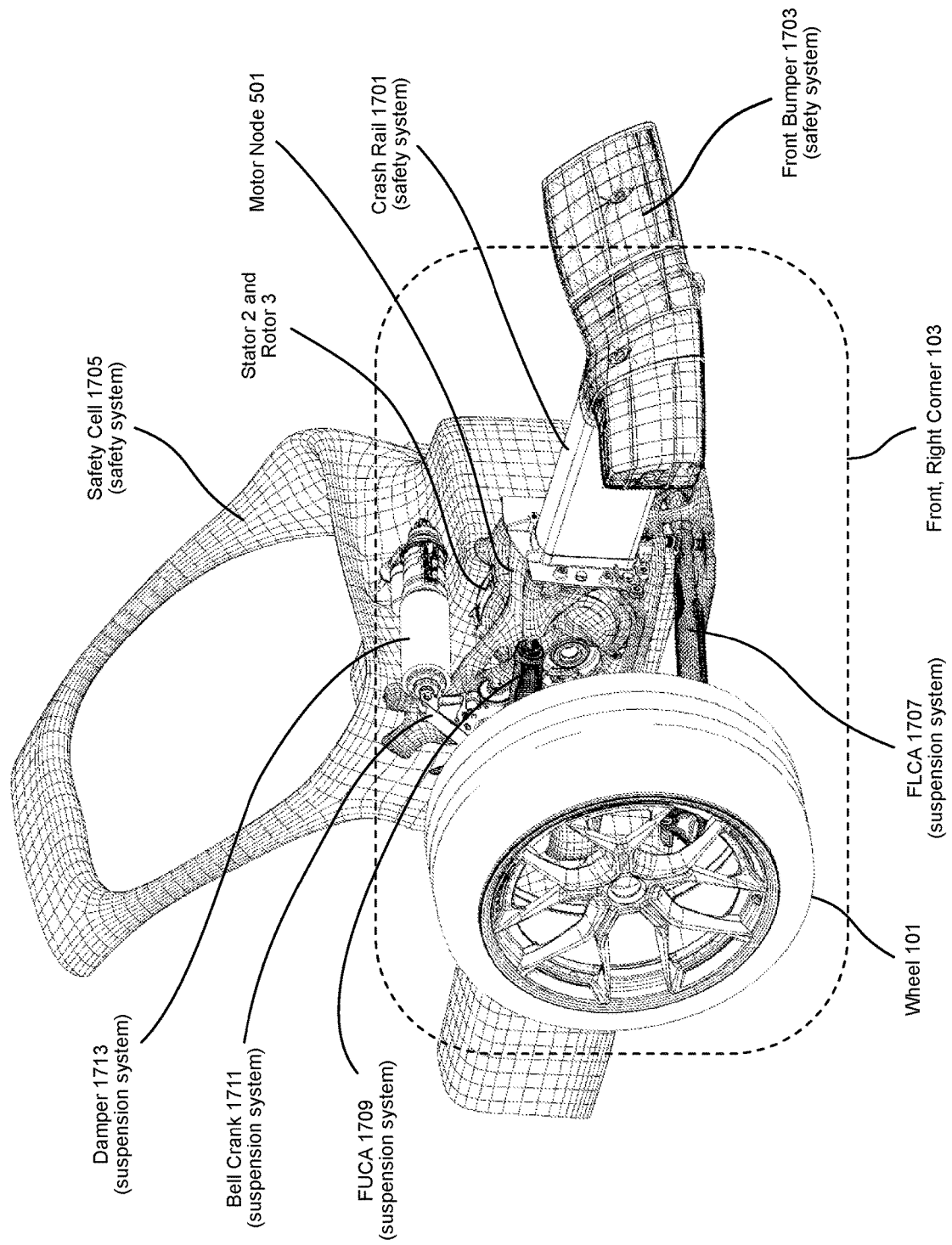
FIG. 17 illustrates some other structures to which the motor node may be connected in various embodiments.

FIG. 17 illustrates some other structures to which motor node 501 may be connected in various embodiments. For example, motor node 501 may be connected to safety system structures, such as a crash rail 1701 (which may in turn connected to a front bumper 1703) and a safety cell 1705. Motor node 501 may also be connected to suspension system structures, such as an FLCA 1707, a FUCA 1709, and a bell crank 1711 (which may in turn be connected to a damper 1713). As described above with respect to FIG. 5, these connections to safety and suspension structures may be made at the connection portions of motor node 501. For example, crash rail 1701 may be connected to motor node 501 at connection portions 507, described above. FLCA 1707 may be connected to motor node 501 at connection portions 509, described above. FUCA 1709 may be connected to motor node 501 at connection portions 511, described above. Bell crank 1711 may be connected to motor node 501 at connection portions 513, described above. Safety cell 1705 may be connected to motor node 501 at connection portions 1001, described above. In various embodiments, these connections may be, for example, adhesive connections, bolted connections, welded connections, etc.

Figure 18:
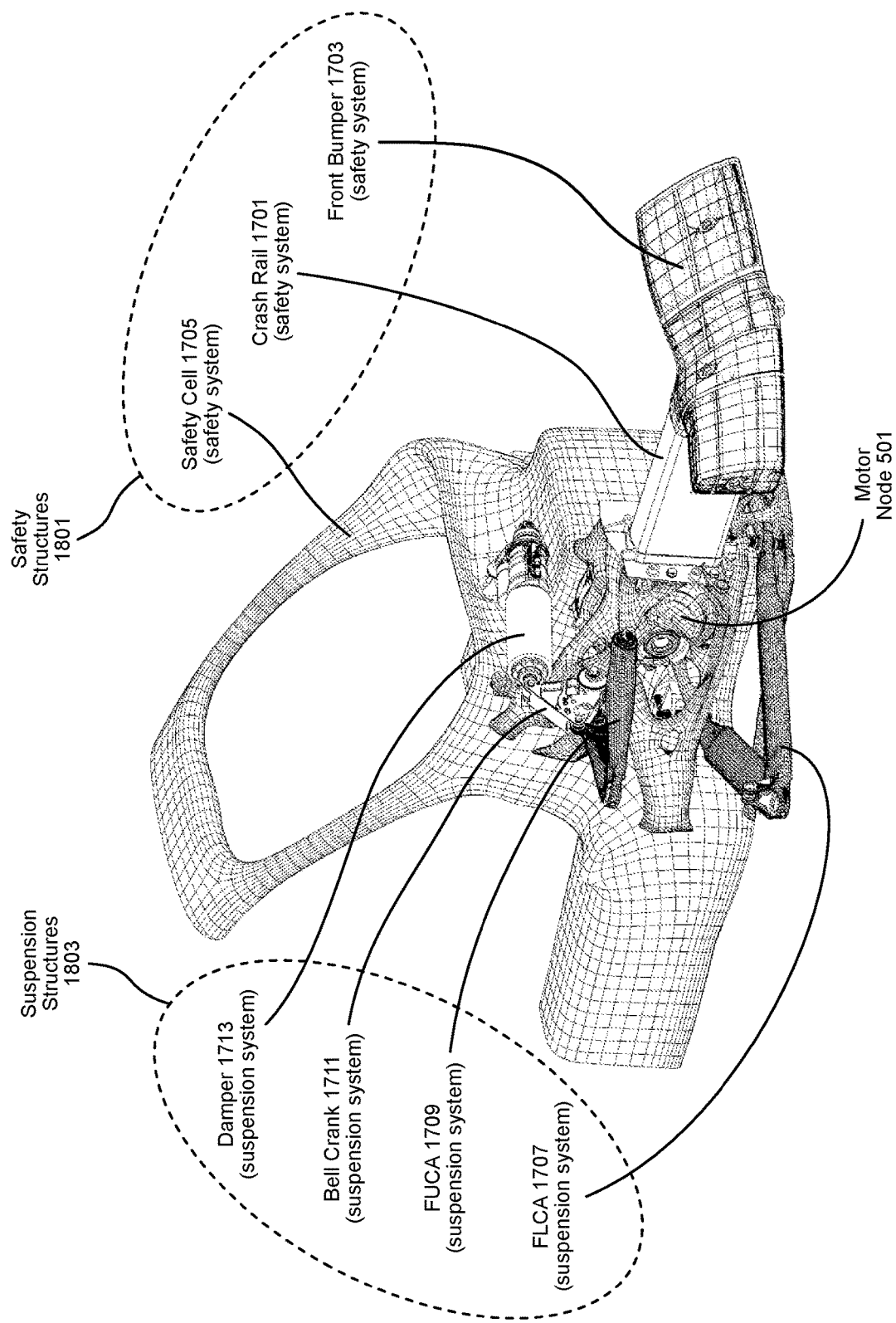
FIG. 18 illustrates two load-bearing systems in hypercar 21.

FIG. 18 illustrates two load-bearing systems in hypercar 21. The safety system of the hypercar can include safety structures 1801, which include crash rail 1701, front bumper 1703, and safety cell 1705. The suspension system of the hypercar can include suspension structures 1803, which include FLCA 1707, FUCA 1709, bell crank 1711, and damper 1713 (the bell crank and damper being part of a suspension damper system). The connections described above between the various safety structures 1801 and motor node 501 can transfer vehicle loads between the safety structures and the motor node, such as crash loads. The connections described above between the various suspension structures 1803 and motor node 501 can transfer vehicle loads between the safety structures and the motor node, such as suspension loads, e.g., vehicle weight and operational loads from bumps, potholes, etc.

Figure 19:
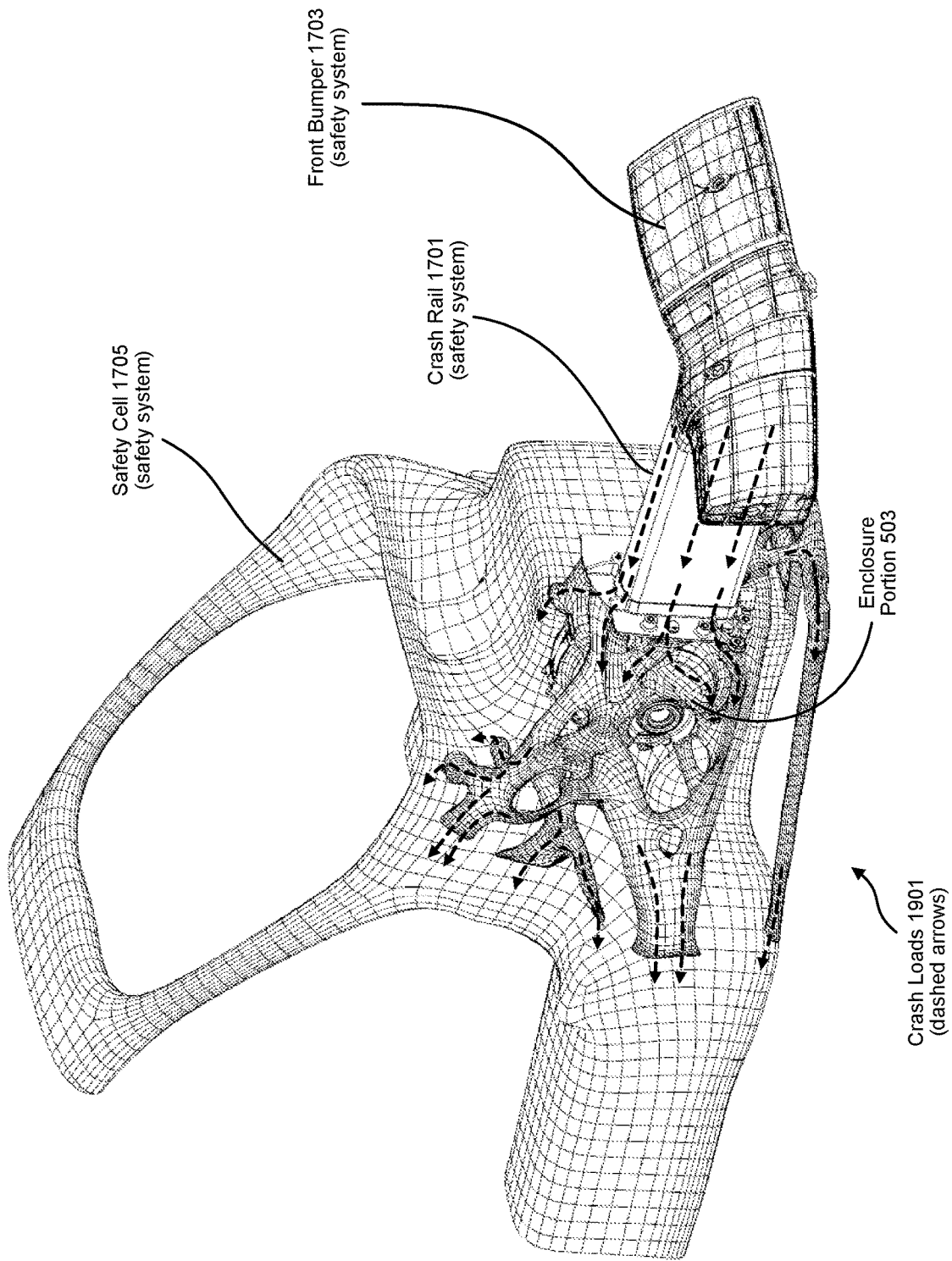
FIG. 19 illustrates example crash load paths through the motor node, for example, in a frontal crash in which the front bumper strikes an object.
Figure 20:
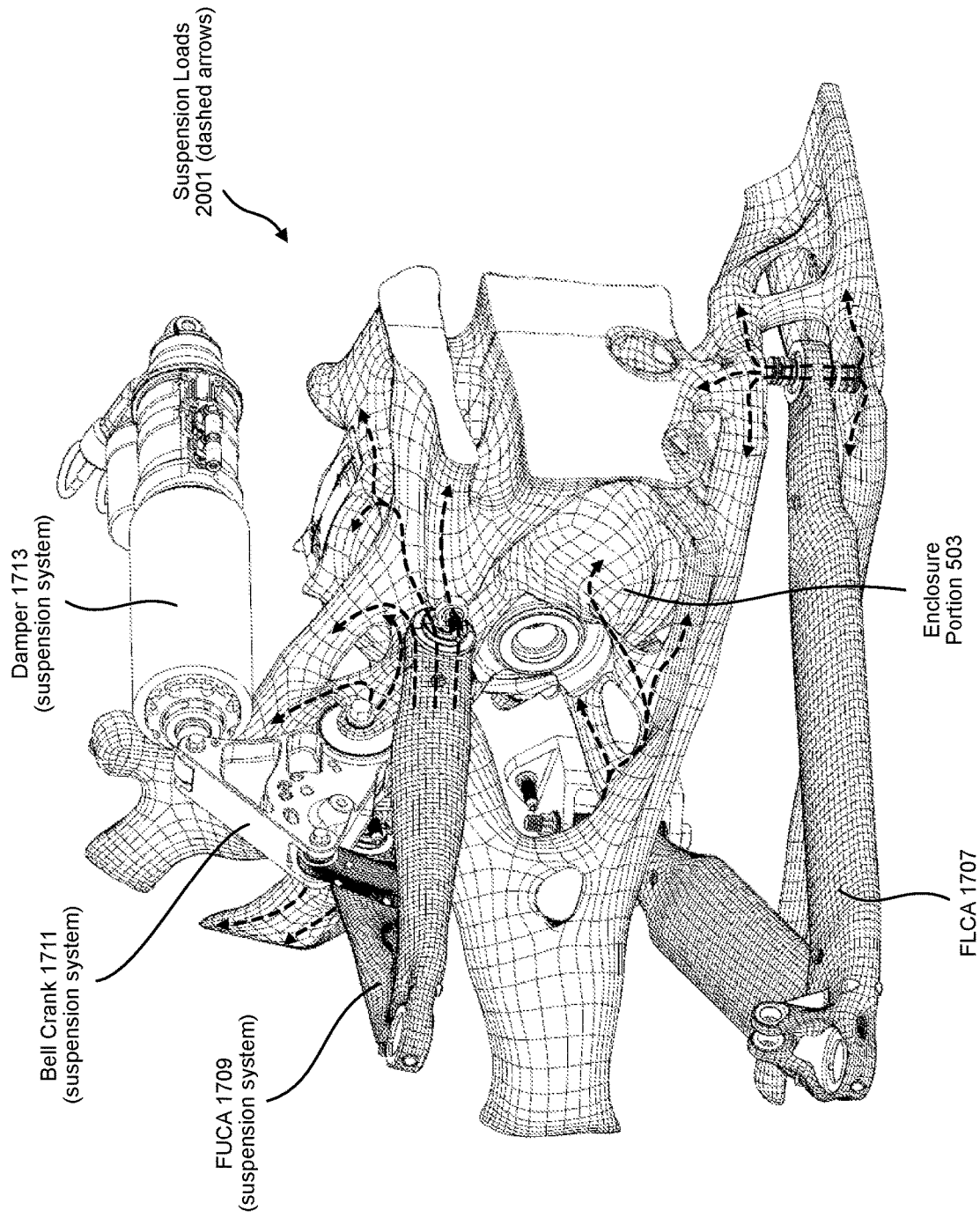
FIGS. 20 and 21 illustrate example suspension load paths through the motor node from two different perspectives.
Figure 21:
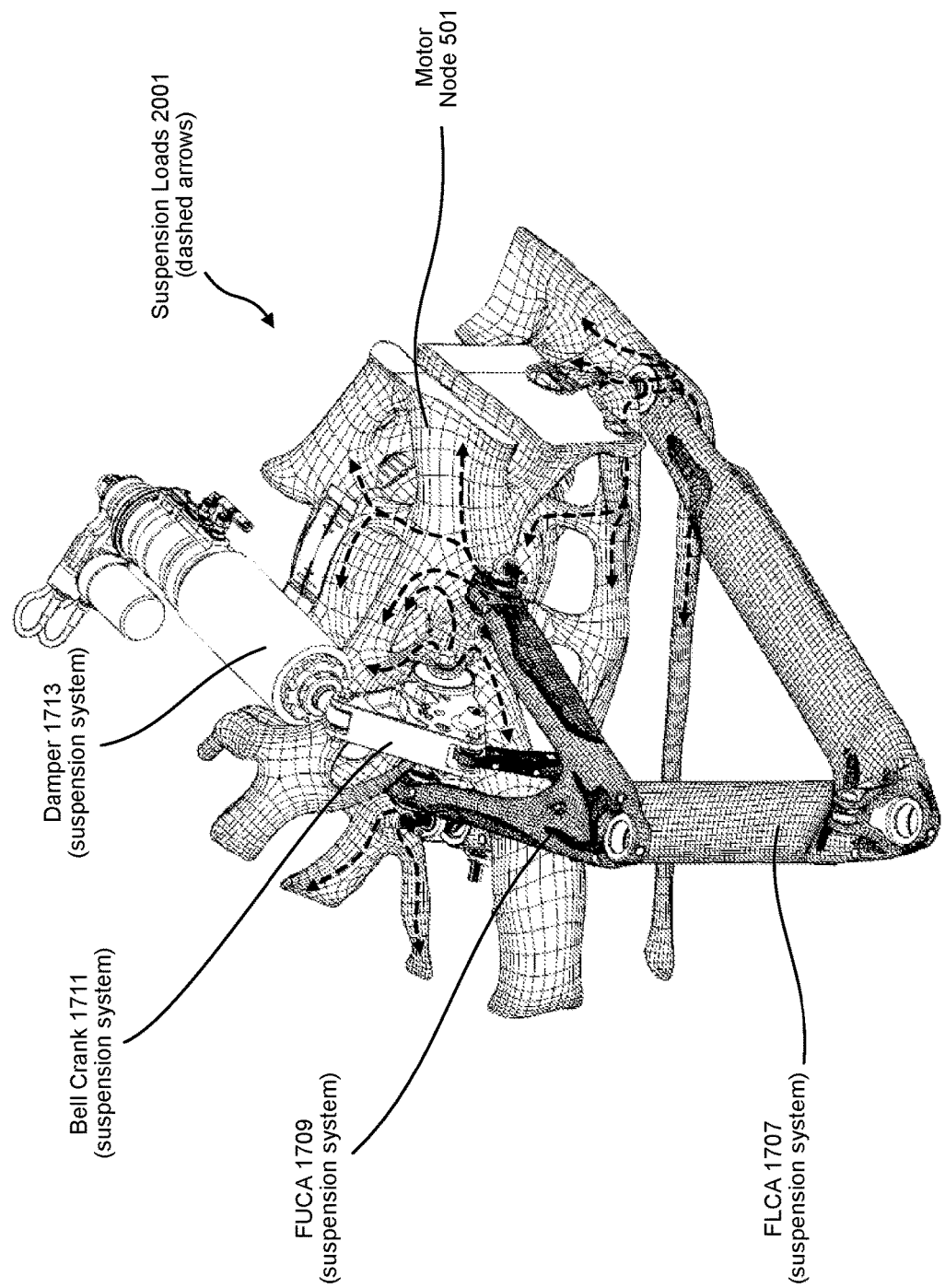

FIGS. 19-21 illustrate example vehicle load paths through motor node 501 for various vehicle loads, e.g., crash and suspension loads. These figures illustrate, for example, that enclosure portion 503 and extended portions 505 can bear and transmit vehicle loads. In various embodiments, extended portions 505 can transfer vehicle loads along physically separate paths, as shown in the present embodiment.

FIG. 19 illustrates example crash load paths through motor node 501, for example, in a frontal crash in which front bumper 1703 strikes an object. Crash loads 1901 are shown as dashed arrowed lines in FIG. 19. Crash loads 1901 are generated by a crash into front bumper 1703 and continue along crash rail 1701. The crash loads in the crash rail are roughly traveling parallel in the same direction, i.e., straight towards the rear of hypercar 21. When crash loads 1901 reach the connection between crash rail 1701 and motor node 501, the crash loads are transferred to the motor node. The crash loads can travel through the motor node because the motor node is configured as a load-bearing structure. The crash loads can travel through extended portions 505 and enclosure portion 503 as shown in the figure. The multiple extended portions can transfer the crash loads along physically separate paths because the extended portions can be physically separated from each other. Vehicle loads, such as crash loads, may be transferred along paths that diverge from each other as shown in the figure. Specifically, many of the extended portions 505 diverge when extending from enclosure portion 503 towards the rear of hypercar 21. As shown in the figure, crash load paths can diverge and be transferred to various locations on safety cell 1705. In this way, for example, crash loads may be distributed across a greater area to cause less damage.

FIGS. 20 and 21 illustrate example suspension load paths through motor node 501 from two different perspectives. Suspension loads 2001 are shown as dashed arrowed lines. Suspension loads 2001 are generated by the weight of hypercar 21 and the operation of driving over bumps, potholes, etc. The suspension loads can travel from the suspension structures 1803, e.g., FLCA 1707, FUCA 1709, and bell crank 1711, through the connection portions connecting the suspension structures to motor node 501. The suspension loads can travel through extended portions 505 and through enclosure portion 503, as shown in the figure. Motor node 501 can be configured to vary the paths of the suspension loads to diverge and/or converge, to connect, etc., to optimize the efficiency of the structure of the motor node. In this way, for example, the overall mass of the motor node and/or surrounding structures may be reduced without reducing performance.

The detailed description set forth above in connection with the appended drawings is intended to provide a description of various example embodiments of the concepts disclosed herein and is not intended to represent the only embodiments in which the disclosure may be practiced. The terms "exemplary" and "example" used in this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the concepts to those skilled in the art. However, the disclosure may be practiced without these specific details. In some instances, well-known structures and components may be shown in block diagram form, or omitted entirely, in order to avoid obscuring the various concepts presented throughout this disclosure.

The previous description is provided to enable any person skilled in the art to practice the various aspects described herein. Various modifications to these example embodiments presented throughout this disclosure will be readily apparent to those skilled in the art. Thus, the claims are not intended to be limited to the example embodiments presented throughout the disclosure, but are to be accorded the full scope consistent with the language claims. All structural and functional equivalents to the elements of the example embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An integrated vehicle structure comprising:
   an enclosure portion configured to house an electric motor; and
   a plurality of extended portions extending from the enclosure portion formed according to a 3D printing design, wherein the plurality of extended portions include a plurality of connection portions configured to connect with a plurality of load-bearing structures of different types, including at least a crash structure or a safety cell, to at least receive or transmit loads, and wherein the enclosure portion and the plurality of extended portions are load-bearing and configured to bear vehicle loads.

2. The integrated vehicle structure of claim 1, wherein at least one of the plurality of connection portions is configured to connect with at least one of the plurality of load-bearing structures by at least an adhesive connection, a bolted connection, or a welded connection.

3. The integrated vehicle structure of claim 2, wherein at least one of the connection portions includes at least a tongue or a groove for the adhesive connection.

4. The integrated vehicle structure of claim 2, wherein at least one of the connection portions includes at least a threaded bolt hole or a protruding bolt portion for the bolted connection.

5. The integrated vehicle structure of claim 1, wherein the plurality of load-bearing structures includes a plurality of safety structures.

6. The integrated vehicle structure of claim 1, wherein the plurality of load-bearing structures includes a suspension structure.

7. The integrated vehicle structure of claim 6, wherein the suspension structure includes at least a control arm or a suspension damper system.

8. The integrated vehicle structure of claim 1, wherein the plurality of extended portions are configured to transfer vehicle loads along physically separate paths.

9. The integrated vehicle structure of claim 8, wherein at least two of the physically separate paths diverge from each other.

10. The integrated vehicle structure of claim 9, wherein the vehicle loads transferred along the at least two of the physically separate paths include crash loads.

11. The integrated vehicle structure of claim 8, wherein the plurality of extended portions includes at least three extended portions.

12. The integrated vehicle structure of claim 11, wherein the plurality of extended portions includes at least four extended portions.

13. The integrated vehicle structure of claim 1, wherein a portion of the enclosure portion defines an opening configured to allow a drive shaft to connect the electric motor to a wheel.

14. The integrated vehicle structure of claim 1, wherein the enclosure portion is configured with an opening for allowing installation and removal of the electric motor.

15. The integrated vehicle structure of claim 14, wherein a part of the enclosure portion surrounding the opening is configured to attach to a part of the electric motor.

16. The integrated vehicle structure of claim 15, wherein the part of the electric motor includes a stator casing.

17. The integrated vehicle structure of claim 15, wherein the part of the enclosure portion surrounding the opening includes a vibration damper interface configured to accept a vibration damper.

18. The integrated vehicle structure of claim 1, wherein at least one of the at least five extended portions are configured to connect with a front lower control arm (FLCA), a front upper control arm (FUCA), a suspension damper system, or a bell crank.

19. An integrated vehicle structure comprising:

an enclosure portion configured to house an electric motor; and at least five extended portions extending directly from the enclosure portion, wherein the enclosure portion and the at least five extended portions are load-bearing and configured to bear vehicle loads, and wherein at least one of the at least five extended portions are configured to connect with a crash structure or a safety cell.

\* \* \* \* \*